United States Patent
Chiang

(10) Patent No.: US 9,875,005 B2
(45) Date of Patent: Jan. 23, 2018

(54) METHOD OF UNLOCKING ELECTRONIC DEVICE BY DISPLAYING UNLOCKING OBJECTS AT RANDOMIZED/USER-DEFINED LOCATIONS AND RELATED COMPUTER READABLE MEDIUM THEREOF

(75) Inventor: Chih-Wei Chiang, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 14/360,933

(22) PCT Filed: Sep. 12, 2012

(86) PCT No.: PCT/CN2012/081284
§ 371 (c)(1),
(2), (4) Date: May 28, 2014

(87) PCT Pub. No.: WO2013/082958
PCT Pub. Date: Jun. 13, 2013

(65) Prior Publication Data
US 2014/0289843 A1    Sep. 25, 2014

Related U.S. Application Data

(60) Provisional application No. 61/568,842, filed on Dec. 9, 2011.

(51) Int. Cl.
*G06F 21/36* (2013.01)
*G06F 3/0482* (2013.01)
(Continued)

(52) U.S. Cl.
CPC ........ *G06F 3/04842* (2013.01); *G06F 3/0488* (2013.01); *G06F 3/04817* (2013.01);
(Continued)

(58) Field of Classification Search
CPC .... G06F 3/04842; G06F 21/36; G06F 3/0488; G06F 3/0482
(Continued)

(56) References Cited

U.S. PATENT DOCUMENTS 7,593,000 B1 *   9/2009   Chin ................. G06F 21/32
                                                     345/156
8,046,721 B2   10/2011   Chaudhri
(Continued)

FOREIGN PATENT DOCUMENTS

CN    101986251 A    3/2011
CN    102270097 A    12/2011

OTHER PUBLICATIONS

"International Search Report" dated Jan. 3, 2013 for International application No. PCT/CN2012/081284, International filing date:Sep. 12, 2012.

*Primary Examiner* — Dede Zecher
*Assistant Examiner* — Dereena Cattungal
(74) *Attorney, Agent, or Firm* — Winston Hsu

(57) ABSTRACT

A method of unlocking an electronic device having a touch-sensitive display includes at least the following steps: controlling the touch-sensitive display to have unlocking objects displayed at different locations for different time points; and when at least one contact is detected on the touch-sensitive display, determining whether to unlock the electronic device by referring to a contact status on the touch-sensitive display. Besides, a computer readable medium storing a program code is also provided, where the program code causes a processor to perform following steps when executed by the processor: controlling the touch-sensitive display to have unlocking objects displayed at different locations for different time points; and when at least one contact is detected on the touch-sensitive display, determining whether to unlock an electronic device by referring to a contact status on the touch-sensitive display.

16 Claims, 18 Drawing Sheets

(51) Int. Cl.
  *G06F 3/0488* (2013.01)
  *G06F 3/0484* (2013.01)
  *G06F 3/0481* (2013.01)
(52) U.S. Cl.
  CPC ...... *G06F 3/04883* (2013.01); *G06F 3/04886* (2013.01); *G06F 21/36* (2013.01)
(58) Field of Classification Search
  USPC ............................................ 726/19; 345/173
  See application file for complete search history.

(56) References Cited

U.S. PATENT DOCUMENTS

| | | | |
|---|---|---|---|
| 8,542,251 B1* | 9/2013 | Gossweiler, III | G06F 3/04883 345/649 |
| 8,621,396 B1* | 12/2013 | Gossweiler, III | G06F 3/0488 713/183 |
| 8,799,777 B1* | 8/2014 | Lee | G06F 3/04886 715/702 |
| 2006/0075250 A1 | 4/2006 | Liao | |
| 2006/0109252 A1* | 5/2006 | Kolmykov-Zotov | G06F 3/03545 345/173 |
| 2007/0150842 A1* | 6/2007 | Chaudhri et al. | 715/863 |
| 2009/0006991 A1 | 1/2009 | Lindberg | |
| 2009/0160778 A1* | 6/2009 | Nurmi et al. | 345/173 |
| 2009/0166099 A1 | 7/2009 | Chen | |
| 2009/0258667 A1 | 10/2009 | Suzuki | |
| 2010/0162182 A1 | 6/2010 | Oh | |
| 2010/0248689 A1 | 9/2010 | Teng | |
| 2013/0014248 A1* | 1/2013 | McLaughlin | H04L 63/083 726/17 |
| 2013/0135226 A1* | 5/2013 | Ho | G06F 3/04883 345/173 |

\* cited by examiner

METHOD OF UNLOCKING ELECTRONIC DEVICE BY DISPLAYING UNLOCKING OBJECTS AT RANDOMIZED/USER-DEFINED LOCATIONS AND RELATED COMPUTER READABLE MEDIUM THEREOF

CROSS REFERENCE TO RELATED APPLICATIONS

This application claims the benefit of U.S. provisional application No. 61/568,842, filed on Dec. 9, 2011 and incorporated herein by reference.

TECHNICAL FIELD

The disclosed embodiments of the present invention relate to unlocking an electronic device, and more particularly, to a method of unlocking an electronic device (e.g., a hand-held device) without displaying unlocking objects (e.g., unlocking icons) at pre-defined locations and related computer-readable medium thereof.

BACKGROUND

Touch-sensitive displays are well known in the art. For example, touch screens are used in many electronic devices to display graphics and text, and to provide a user interface through which a user may interact with the electronic devices. A touch screen detects and responds to contact(s) on the touch screen. A device may display one or more soft keys, menus, and other user-interface objects on the touch screen. A user may interact with the device by contacting the touch screen at locations corresponding to the user-interface objects with which he/she wishes to interact.

One problem associated with using touch screens on electronic devices is the unintentional activation or deactivation of functions due to unintentional contact with the touch screen. Thus, when a predefined lock condition is met, the electronic device may be locked automatically to avoid receiving unintentional activation or deactivation of functions due to user's unintentional contact. Alternatively, the electronic device may be manually locked by the user anytime. Electronic devices with touch screens may be unlocked by any of several well-known unlocking procedures, such as entering pre-defined passwords, pressing pre-defined buttons, entering pre-defined gestures, touching pre-defined locations on the touch screen, etc. However, these conventional unlock procedures are either complicated or not user-friendly. Thus, there is a need for a more efficient, user-friendly procedure for unlocking an electronic device.

SUMMARY

In accordance with exemplary embodiments of the present invention, a method of unlocking an electronic device (e.g., a hand-held device) without displaying unlocking objects (e.g., unlocking icons) at pre-defined locations and related computer readable medium thereof are proposed to solve the above-mentioned problems.

According to a first aspect of the present invention, an exemplary method of unlocking an electronic device having a touch-sensitive display is disclosed. The exemplary method includes: controlling the touch-sensitive display to have unlocking objects displayed at different locations for different time points; and when at least one contact is detected on the touch-sensitive display, determining whether to unlock the electronic device by referring to a contact status on the touch-sensitive display.

According to a second aspect of the present invention, an exemplary computer readable medium storing a program code is disclosed. The program code causes a processor to perform following steps when executed by the processor: controlling the touch-sensitive display to have unlocking objects displayed at different locations for different time points; and when at least one contact is detected on the touch-sensitive display, determining whether to unlock the electronic device by referring to a contact status on the touch-sensitive display.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The conception of the present invention is to control a touch-sensitive display (e.g., a touch screen) of an electronic device (e.g., a hand-held device) to have unlocking objects (e.g., unlocking icons) displayed at different locations for different time points, where the locations of the unlocking objects may be manually defined by the user or randomly defined by the electronic device. Hence, unlocking the electronic device in an interactive manner does not need pre-defined passwords, pre-defined gestures, pre-defined touch positions, and/or additional built-in devices (e.g., gyro sensor, touch sensor, camera, etc.). In this way, a more efficient, user-friendly procedure for unlocking the electronic device is provided to improve the user experience. Further details are described as below.

Figure 1:
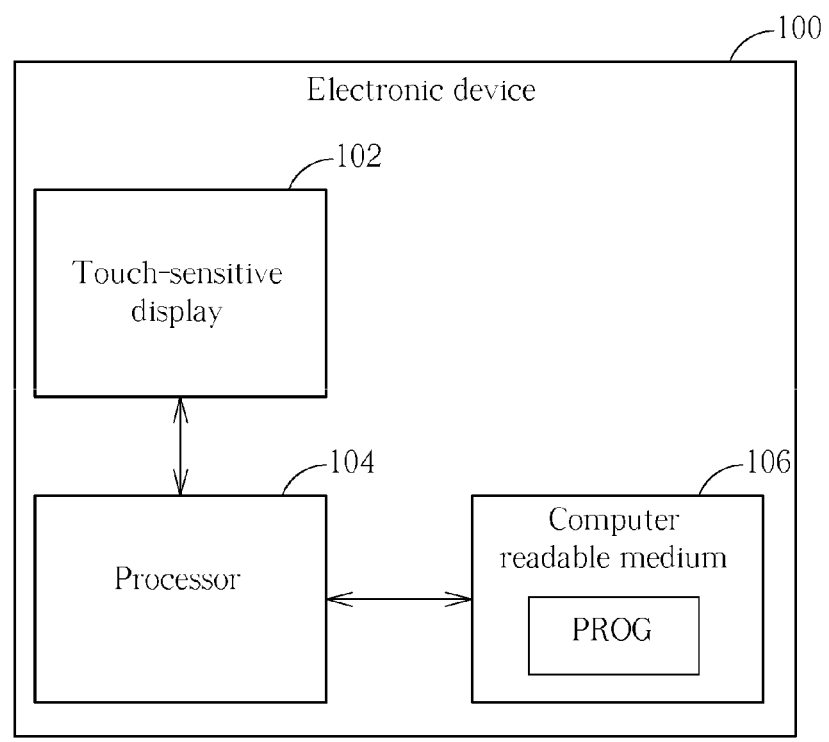
FIG. 1 is a block diagram illustrating an electronic device according to an embodiment of the present invention.

FIG. 1 is a block diagram illustrating an electronic device according to an embodiment of the present invention. By way of example, the electronic device 100 may be a hand-held device such as a mobile phone. As shown in FIG. 1, the electronic device 100 includes a touch-sensitive display 102, a processor 104 and a computer readable medium 106. For example, the touch-sensitive display 102 may be a touch screen, the processor 104 may be a central processing unit (CPU) or a micro control unit (MCU), and the computer readable medium 106 may be a memory device such as a volatile memory or a non-volatile memory. A program code PROG is stored in the computer readable medium 106. The program code PROG causes the processor 104 to control operation of the electronic device 100 when executed by the processor 104. For example, the program code PROG includes unlocking instructions for controlling the unlocking procedure of the electronic device 100. Hence, when the unlocking instructions of the program code PROG are executed by the processor 104, the processor 104 is operative to perform following steps: controlling the touch-sensitive display 102 to have unlocking objects displayed at different locations for different time points; and when at least one contact is detected on the touch-sensitive display 102, determining whether to unlock the electronic device 100 by referring to a contact status on the touch-sensitive display 102. The contact status on the touch-sensitive display 102 may indicate occurrence of contacts, locations of contacts detected, a time interval between successive contacts, etc. Unlocking objects may be displayed in term of icons, symbols, or other image-based patterns.

The touch-sensitive display 102 may be configured to operate in a single-touch mode or a multi-touch mode. In a case where the touch-sensitive display 102 is operated in a single-touch mode, only one unlocking icon is selected by user's finger in each touch operation. As a result, multiple unlocking icons may be touched by user's finger sequentially (i.e., nonsimultaneously). In another case where the touch-sensitive display 102 is operated in a multi-touch mode, multiple unlocking icons may be simultaneously selected by user's fingers in each touch operation. Thus, based on the unlocking icons selected by the user through the touch-sensitive display 102 when the electronic device 100 is in a lock state, the processor 104 determines if the electronic device 100 should be unlocked. With a proper design of the program code PROG, the processor 1004 is configured to employ one of the proposed unlocking procedures discussed hereinafter to control the unlocking of the electronic device 100.

Figure 2:
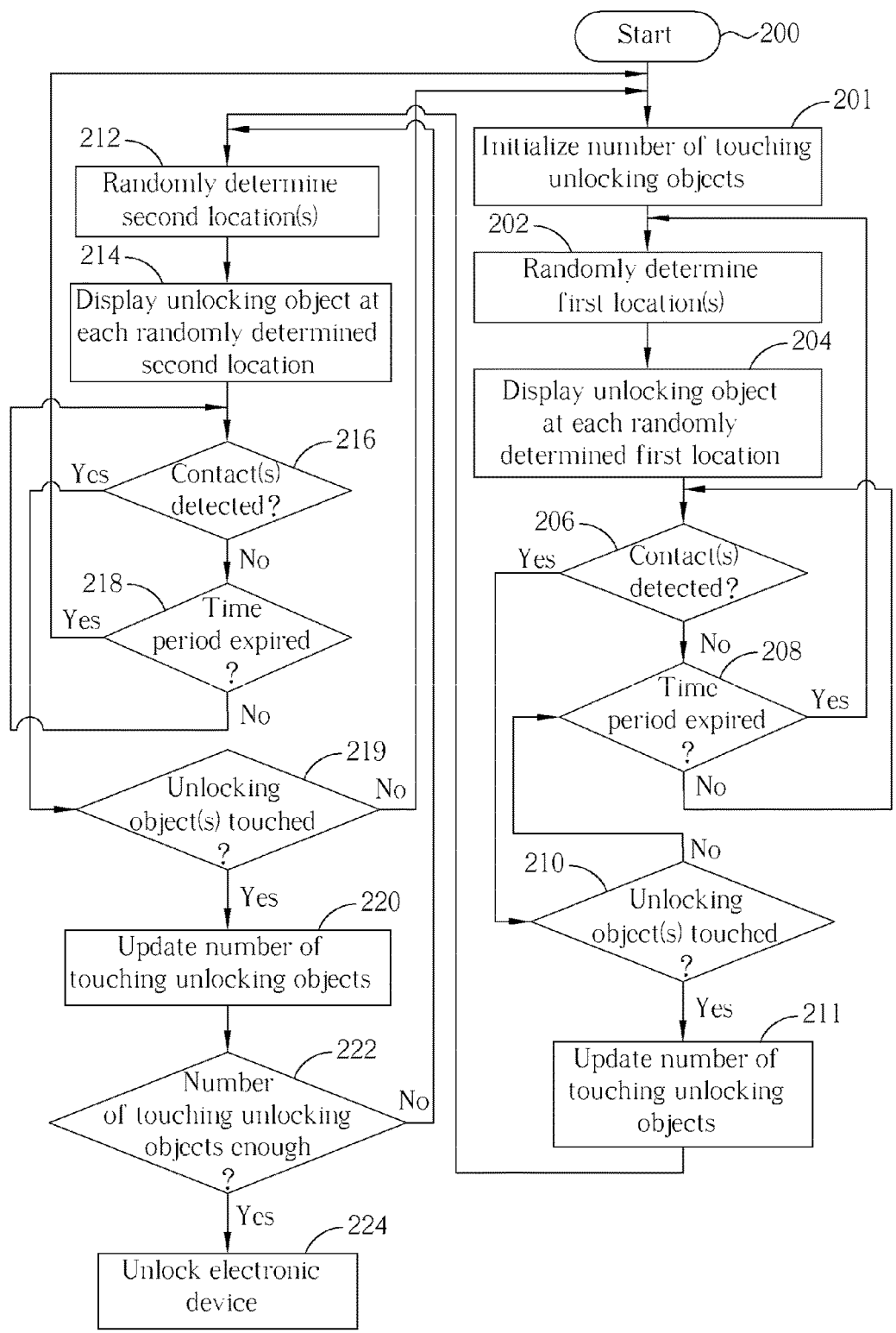
FIG. 2 is a flowchart illustrating a method of unlocking the electronic device shown in FIG. 1 according to a first embodiment of the present invention.

FIG. 2 is a flowchart illustrating a method of unlocking the electronic device 100 shown in FIG. 1 according to a first embodiment of the present invention. If the result is substantially the same, the steps are not required to be executed in the exact order shown in FIG. 2. Besides, other steps may be added, and/or one or more steps may be omitted. The exemplary unlocking procedure is performed/controlled by the processor 104 executing the program code PROG, and includes following steps.

Step 200: Start.

Step 201: Set the number of contacts with the touch-sensitive display 102 detected at locations where unlocking objects are displayed (i.e., the number of touching unlocking objects) by an initial value (e.g., 0).

Step 202: Randomly determine at least a first location.

Step 204: Control the touch-sensitive display 102 to display an unlocking object at each randomly determined first location.

Step 206: Check if at least one contact is detected on the touch-sensitive display 102. If yes, go to step 210; otherwise, go to step 208.

Step 208: Check if a predetermined time period for displaying unlocking object(s) is expired. If yes, go to step 202 to change the randomly determined location(s); otherwise, go to step 206 to keep checking occurrence of contact(s).

Step 210: Check if at least one displayed unlocking object is touched. If yes, go to step 211; otherwise, go to step 208.

Step 211: Update the number of touching unlocking objects.

Step 212: Randomly determine at least a second location.

Step 214: Control the touch-sensitive display 102 to display an unlocking object at each randomly determined second location.

Step 216: Check if at least one contact is detected on the touch-sensitive display 102. If yes, go to step 219; otherwise, go to step 218.

Step 218: Check if the predetermined time period for displaying unlocking object(s) is expired. If yes, go to step 201 to restart the unlocking procedure; otherwise, go to step 216 to keep checking occurrence of contact(s).

Step 219: Check if a time interval between two contacts successively detected at locations where unlocking objects are displayed is smaller than a first predetermined threshold. If yes, go to step 220; otherwise, go to step 201 to restart the unlocking procedure.

Step 220: Update the number of touching unlocking objects.

Step 222: Check if the number of touching unlocking objects reaches a second predetermined threshold. If yes, go to step 224; otherwise, go to step 212 to change the randomly determined location(s).

Step 224: Unlock the electronic device 100.

In the beginning of the unlocking procedure, the electronic device 100 stays in a lock state such that no function is allowed to be activated/deactivated by the electronic device 100 unless the electronic device 100 is unlocked. In this embodiment, the number of contacts with the touch-sensitive display 102 detected at locations where unlocking objects are displayed (i.e., the number of touching unlocking objects) is a criterion for unlocking the electronic device 100. As no contact is detected on the touch-sensitive display 102 yet, the number of touching unlocking objects is initialized in step 201.

As mentioned above, each unlocking object is not displayed at a pre-defined location of the touch-sensitive display 102. In this embodiment, locations assigned to unlocking objects would be randomized. In other words, an unlocking icon may be displayed at one location for a first time point and displayed at another location for a second time point. Hence, before a contact touching any unlocking object on the touch-sensitive display 102 is detected, one or more first locations are randomly determined (step 202), and the touch-sensitive display 102 is controlled to display an unlocking object at each first location (step 204). Please refer to FIG. 3, which is a diagram illustrating a first exemplary operational scenario of the unlocking procedure according to the present invention. The locations L1-L4 of the unlocking icons (e.g., zodiac icons/symbols) 301-304 are randomly determined.

Figure 3:
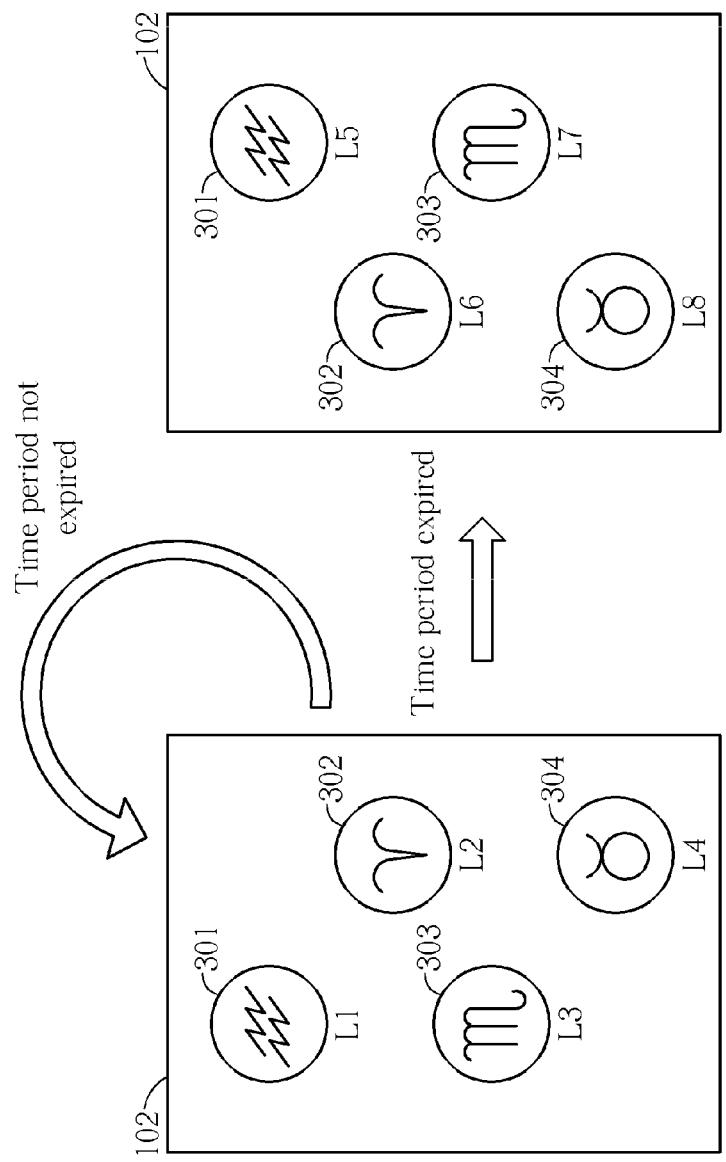
FIG. 3 is a diagram illustrating a first exemplary operational scenario of the unlocking procedure according to the present invention.

Next, the processor 104 checks the touch detection output generated from the touch-sensitive display 102 to determine if at least one contact is detected on the touch-sensitive display 102 (step 206). If there is no contact found on the touch-sensitive display 102, meaning that no unlocking object is touched by the user, the processor 104 would determine if location(s) of the currently displayed unlocking object(s) should be changed. In this embodiment, the processor 104 checks if a predetermined time period for displaying unlocking object(s) is expired (step 208). When it is determined that the predetermined time period is not expired yet, location of each currently displayed unlocking object is not changed. As shown in FIG. 3, the touch-sensitive display 102 keeps displaying the unlocking icons 301-304 at respective locations L1-L4 when the condition of changing the icon locations is not met. However, when it is determined that the predetermined time period is expired, the locations assigned to the unlocking icons 301-304 are randomized. Hence, one or more first locations are randomly determined again (step 202), and the touch-sensitive display 102 is controlled to display an unlocking object at each re-generated first location (step 204). As shown in FIG. 3, when the unlocking icons 302-308 have been displayed for a long time without being touched by the user, the touch-sensitive display 102 is controlled to display the unlocking icons 301-304 at updated locations L5-L8, respectively. It should be noted that the number of unlocking objects displayed before any unlocking object is touched may be adjusted, depending upon actual design requirement/consideration. For example, the touch-sensitive display 102 in FIG. 3 may be controlled to show two zodiac icons/symbols only.

When step 206 determines that at least one contact is detected, step 210 is executed to check if at least one displayed unlocking object is touched by the user. If no displayed unlocking object is touched (i.e., the touch-sensitive display 102 may be unintentionally touched), the flow proceeds with step 208 such that the processor 104 would determine if location(s) of currently displayed unlocking object(s) should be changed, as mentioned above. However, if at least one displayed unlocking object is touched, it is possible that the user may want to unlock the electronic device 100. Thus, the number of touching unlocking objects is updated (step 211). For example, an increment value (e.g., 1) is added to the current number of touching unlocking objects.

Figure 4:
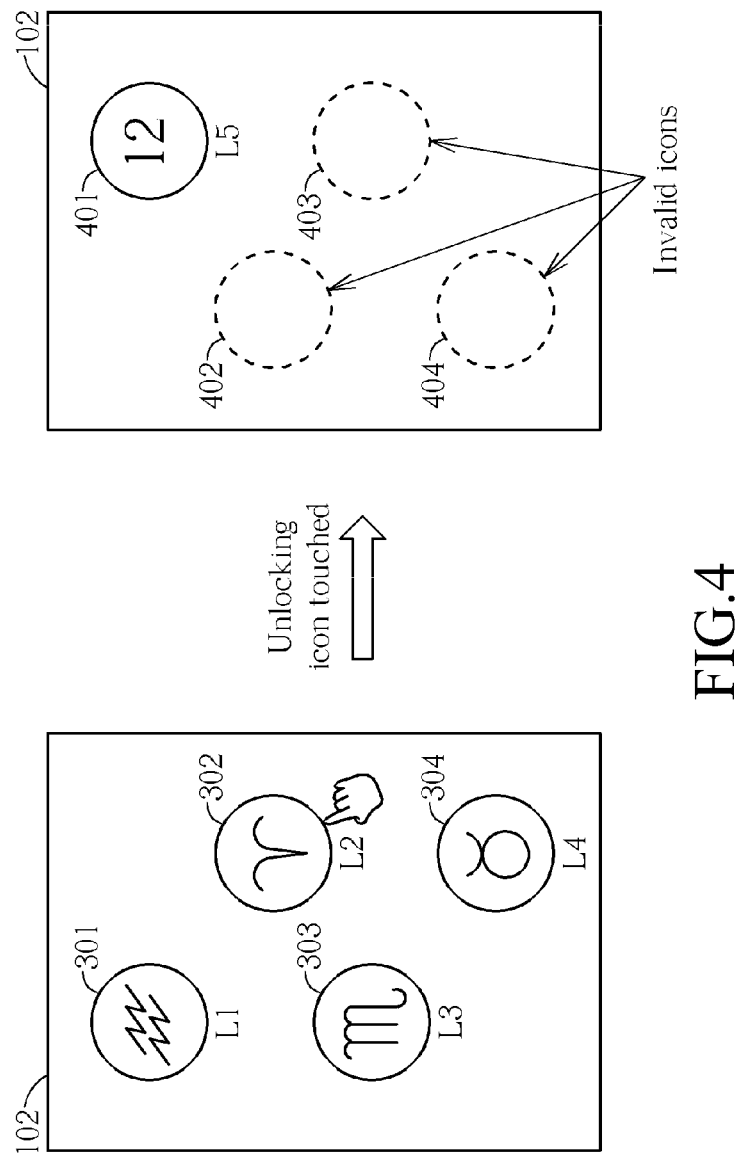
FIG. 4 is a diagram illustrating a second exemplary operational scenario of the unlocking procedure according to the present invention.

To prevent the electronic device 100 from being unlocked due to unintentional touch, more than one contact with an unlocking object displayed on the electronic device 100 is required. Hence, locations assigned to unlocking objects would be randomized. In other words, before a follow-up contact touching any unlocking object on the touch-sensitive display 102 is detected, one or more second locations are randomly determined (step 212), and the touch-sensitive display 102 is controlled to display an unlocking object at each second location (step 214). Please refer to FIG. 4, which is a diagram illustrating a second exemplary operational scenario of the unlocking procedure according to the present invention. After the unlocking icon 302 is touched by the user, the location L5 of an unlocking icon (e.g., one icon showing a lucky number "12") 401 is randomly determined In this embodiment, at least one second unlocking object (e.g., the unlocking icon 401) is displayed on the touch-sensitive display 102 in response to at least one first contact detected (e.g., the locking icon 302 touched). Besides, the number of second unlocking objects displayed on the touch-sensitive display 102 at the second time point is smaller than the number of first unlocking objects displayed on the touch-sensitive display 102, and the type of information shown on the at least one second unlocking object is different from the type of information shown on the at least one first unlocking object. As shown in FIG. 4, the unlocking icons 301-304, which show zodiac information, are transformed such that only one unlocking icon 401 is a valid icon showing the lucky number "12" while the other icons 402-404 are blanked to be invalid icons. Therefore, the number of the unlocking icon 401 actually displayed on the touch-sensitive display 102 is particularly designed to be smaller than the number of unlocking icons 301-304 actually displayed on the touch-sensitive display 102, which is capable of lowering the probability of unintentionally unlocking the electronic device 100.

However, the example shown in FIG. 4 is for illustrative purposes only, and is not meant to be a limitation of the present invention. For instance, the unlocking icons 301-304 may be modified to show date information, and the unlocking icon 401 may be modified to shown time information. In addition, the number of unlocking icons displayed before an unlocking icon is touched and the number of unlocking icons displayed after the unlocking icon is touched may be adjusted, depending upon actual design requirement/consideration.

Figure 5:
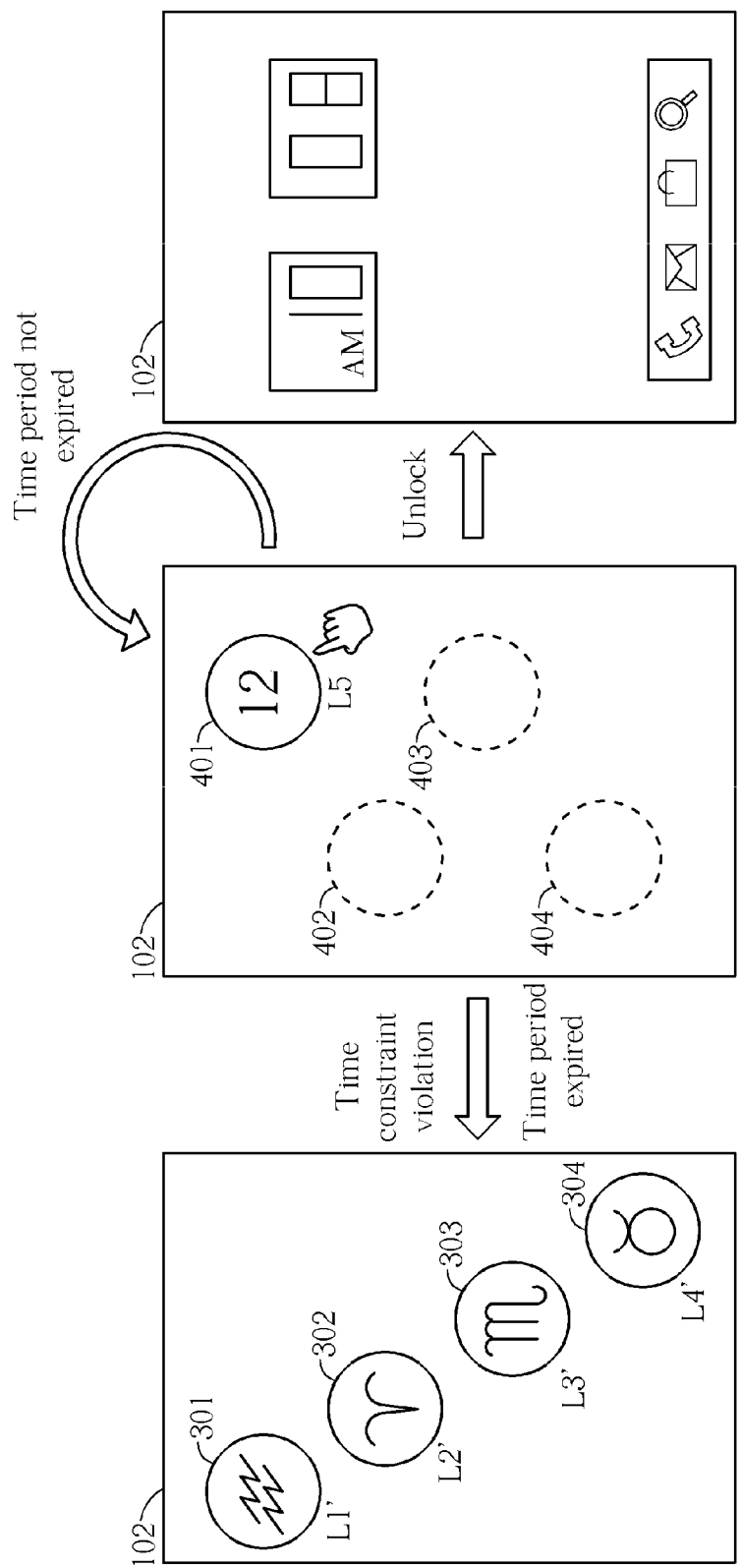
FIG. 5 is a diagram illustrating a third exemplary operational scenario of the unlocking procedure according to the present invention.

After the at least one second unlocking object (e.g., the unlocking icon 401) is displayed on the touch-sensitive display 102, the processor 104 checks the touch detection output generated from the touch-sensitive display 102 to determine if at least one contact is detected on the touch-sensitive display 102 (step 216). If there is no contact found on the touch-sensitive display 102, meaning that no unlocking object is touched by the user, the processor 104 would determine if location(s) of currently displayed unlocking object(s) should be changed. In this embodiment, the processor 104 checks if a predetermined time period for displaying unlocking object(s) is expired (step 218). When the predetermined time period is not expired yet, location of each currently displayed unlocking object is not changed. FIG. 5 is a diagram illustrating a third exemplary operational scenario of the unlocking procedure according to the present invention. As shown in FIG. 5, the touch-sensitive display 102 keeps displaying the unlocking icon 401 at the location L5 when the condition of changing the icon location is not met. However, when it is determined that the predetermined time period is expired, the unlocking procedure is restarted. Thus, the flow proceeds with step 201 to re-initialize the number of touching the unlocking objects. Next, at least one first location is randomly determined again, and the touch-sensitive display 102 is controlled to display an unlocking object at each re-generated first location. Regarding the example shown in FIG. 5, when the unlocking icon 401 has been displayed for a long time without being touched by the user, the touch-sensitive display 102 is controlled to display the unlocking icons 301-304 at randomized locations L1'-L4', respectively.

When step 216 finds that at least one contact is detected, step 219 is executed to check if the time constraint is violated. In this embodiment, the processor 104 checks if a time interval between two contacts successively detected at locations where unlocking objects are displayed is smaller than a first predetermined threshold. If the time interval between two successive contacts touching unlocking objects is not smaller than the first predetermined threshold, the time constraint violation occurs, and the unlocking procedure is restarted. Thus, the flow proceeds with step 201 to re-initialize the number of touching the unlocking objects. Next, at least one first location is randomly determined again, and the touch-sensitive display 102 is controlled to display an unlocking object at each re-generated first location. Regarding the example shown in FIG. 5, when the unlocking icon 401 is not touched in time, the touch-sensitive display 102 is controlled to display the unlocking icons 301-304 at respective randomized locations L1'-L4' due to time constraint violation.

On the other hand, when step 219 finds that the time constraint is not violated, the flow proceeds with step 220 such that the number of touching unlocking objects is updated. For example, an increment value (e.g., 1) is added to the currently recorded number of touching unlocking objects. Next, the processor 104 checks if the criterion of unlocking the electronic device 100 is satisfied (step 222). In this embodiment, the processor 104 checks if the number of touching unlocking objects reaches a second predetermined threshold. Assuming that the second predetermined threshold is set by 2, the criterion of unlocking the electronic device 100 is satisfied when the user touches the unlocking icons 302 and 401 sequentially. As shown in FIG. 5, the electronic device 100 is unlocked, and the user is allowed to activate/deactivate functions of the electronic device 100 by entering the user input via the normal user interface provided by the touch-sensitive display 102. If step 222 finds that the criterion of unlocking the electronic device 100 is not satisfied yet, the flow proceeds with step 212.

Please note that the flow shown in FIG. 2 merely serves as example of the unlocking procedure. In an alternative design, one or more steps shown in FIG. 2 may be omitted. For example, steps 208, 218 and/or 219 may be optional. Further, in a case where the electronic device 100 is allowed to be unlocked when two unlocking objects are sequentially touched at different time points, steps 220 and 222 may be omitted. These alternative designs all fall within the scope of the present invention.

In above example, the unlocking objects (e.g., unlocking icons 302 and 401) are required to be sequentially touched by the user to satisfy the criterion of unlocking the electronic device 100. However, in an alternative design where the touch-sensitive display 102 supports a multi-touch mode, the criterion of unlocking the electronic device 100 may be satisfied by touching multiple unlocking objects simultaneously. Please refer to FIG. 6, which is a flowchart illustrating a method of unlocking the electronic device 100 shown in FIG. 1 according to a second embodiment of the present invention. If the result is substantially the same, the steps are not required to be executed in the exact order shown in FIG. 6. The exemplary unlocking procedure is performed/controlled by the processor 104 executing the program code PROG, and includes following steps.

Step 600: Start.

Step 601: Set the number of contacts with the touch-sensitive display 102 detected at locations where unlocking objects are displayed (i.e., the number of touching unlocking objects) by an initial value (e.g., 0).

Step 602: Randomly determine a plurality of first locations.

Step 604: Control the touch-sensitive display 102 to display an unlocking object at each randomly determined first location.

Step 606: Check if multiple contacts are detected on the touch-sensitive display 102. If yes, go to step 610; otherwise, go to step 608.

Step 608: Check if a predetermined time period for displaying unlocking objects is expired. If yes, go to step 602 to change randomly determined locations; otherwise, go to step 606 to keep checking occurrence of multiple contacts.

Step 610: Check if multiple displayed unlocking objects are touched simultaneously. If yes, go to step 611; otherwise, go to step 608.

Step 611: Update the number of touching unlocking objects.

Step 612: Check if the number of touching unlocking objects reaches a predetermined threshold. If yes, go to step 622; otherwise, go to step 614.

Step 614: Randomly determine a plurality of second locations.

Step 616: Control the touch-sensitive display 102 to display an unlocking object at each randomly determined second location.

Step 618: Check if multiple contacts are detected on the touch-sensitive display 102. If yes, go to step 620; otherwise, go to step 619.

Step 619: Check if a predetermined time period for displaying unlocking objects is expired. If yes, go to step 601 to restart the unlocking procedure; otherwise, go to step 618 to keep checking occurrence of multiple contacts.

Step 620: Check if multiple displayed unlocking objects are touched simultaneously. If yes, go to step 612; otherwise, go to step 619.

Step 622: Unlock the electronic device 100.

Figure 6:
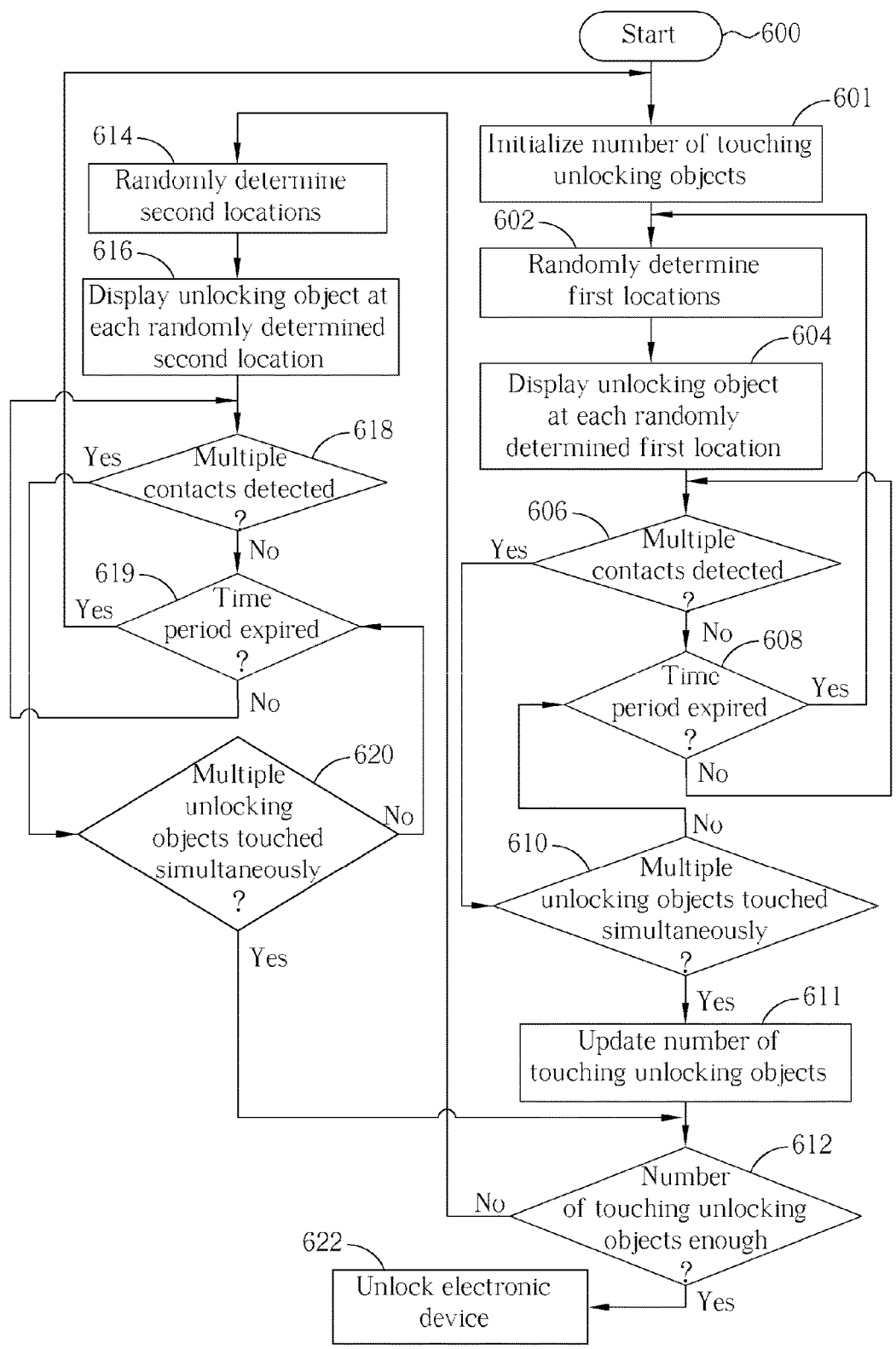
FIG. 6 is a flowchart illustrating a method of unlocking the electronic device shown in FIG. 1 according to a second embodiment of the present invention.
Figure 7:
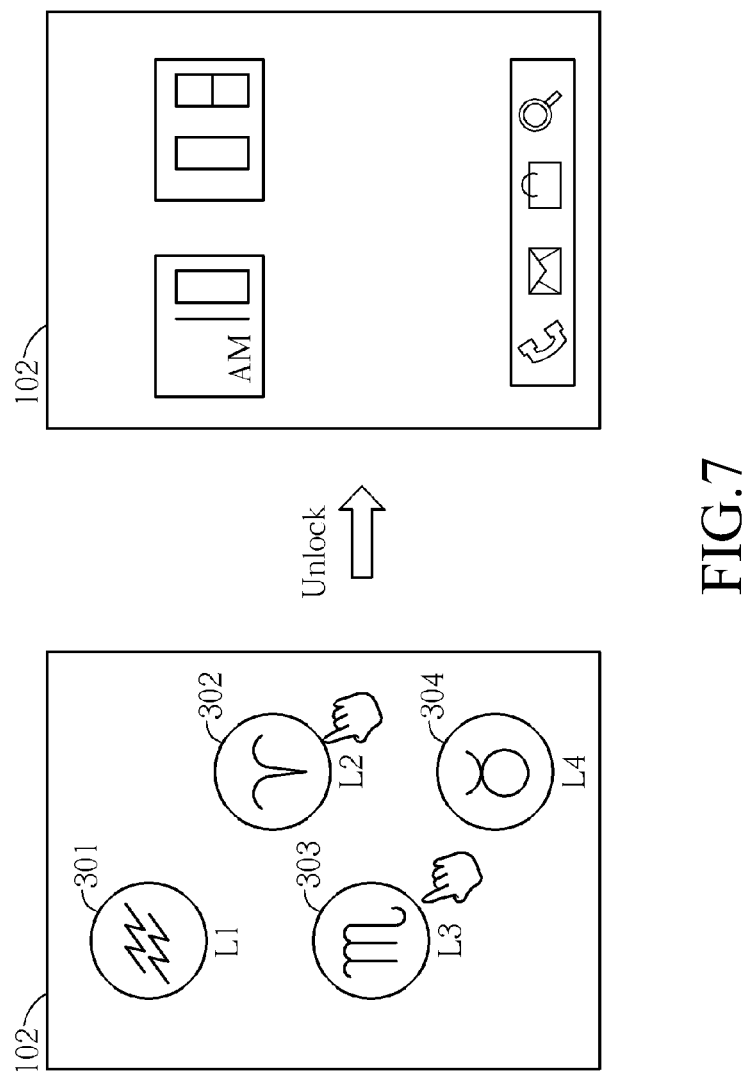
FIG. 7 is a diagram illustrating a fourth exemplary operational scenario of the unlocking procedure according to the present invention.

The major difference between the unlocking procedures shown in FIG. 2 and FIG. 6 is the unlocking condition. Suppose that the predetermined threshold is set by 2. Therefore, when two unlocking objects displayed on the touch-sensitive display 102 are touched simultaneously, the criterion of unlocking the electronic device 100 is satisfied according to this embodiment. FIG. 7 is a diagram illustrating a fourth exemplary operational scenario of the unlocking procedure according to the present invention. As shown in FIG. 7, the electronic device 100 is unlocked due to two unlocking icons 302 and 303 simultaneously touched, and the user is allowed to activate/deactivate functions of the unlocked electronic device 100 by entering the user input via the normal user interface provided by the touch-sensitive display 102.

As a person skilled in the art can readily understand details of the steps shown in FIG. 6 after reading above paragraphs, further description is omitted here for brevity. It should be noted that the number of a plurality of unlocking icons simultaneously displayed on the touch-sensitive display 102 may be adjusted, depending upon actual design requirement/consideration. For example, when the electronic device 10 enters the lock state, the processor 104 may control the touch-sensitive display 102 to have only two unlocking icons displayed thereon. Hence, when the two unlocking icons are simultaneously touched by the user, the electronic device 10 is unlocked correspondingly.

Please note that the flow shown in FIG. 6 merely serves as example of the unlocking procedure. In an alternative design, one or more steps shown in FIG. 6 may be omitted. For example, steps 608 and/or 619 may be optional. Besides, in a case where the electronic device 100 is allowed to be unlocked when two unlocking objects are simultaneously touched at the same time point, step 611-620 may be omitted. Thus, the electronic device 100 is unlocked when step 310 determines that multiple unlocking objects are touched simultaneously. These alternative designs all fall within the scope of the present invention.

Figure 8:
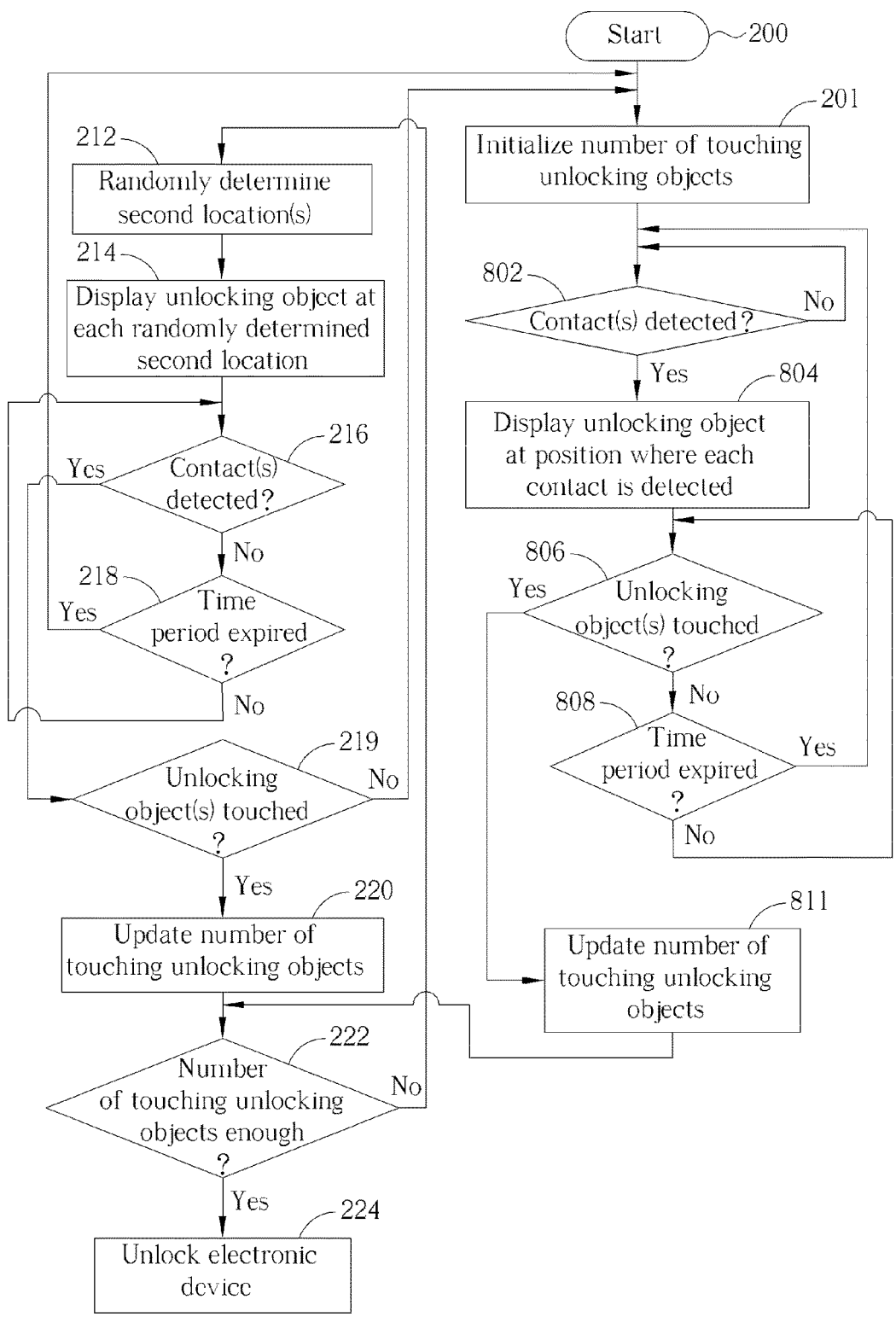
FIG. 8 is a flowchart illustrating a method of unlocking the electronic device shown in FIG. 1 according to a third embodiment of the present invention.

As to the aforementioned examples, locations of unlocking objects are randomly determined/defined by the processor 104 executing the program code PROG. For example, at a first time point (e.g., in an initial unlocking procedure), the processor 104 determines one or more positions randomly, and controls the touch-sensitive display 102 to display an unlocking object at each randomly determined position; and at a second time point (e.g., in a restarted unlocking procedure), the processor 104 determines one or more positions randomly, and controls the touch-sensitive display 102 is controlled to display an unlocking object at each randomly determined position. Alternatively, locations of unlocking objects may be manually determined/defined by the user. Please refer to FIG. 8, which is a flowchart illustrating a method of unlocking the electronic device 100 shown in FIG. 1 according to a third embodiment of the present invention. If the result is substantially the same, the steps are not required to be executed in the exact order shown in FIG. 8. The flow shown in FIG. 8 is derived from modifying the flow shown in FIG. 2. The major difference between the unlocking procedures shown in FIG. 2 and FIG. 8 is the determination of initial location(s) of unlocking object(s) when the unlocking procedure is started or restarted. More specifically, steps 202, 204, 206, 208 and 211 are replaced with steps 802, 804, 806, 808 and 811, as below.

Step 802: Check if at least one contact is detected on the touch-sensitive display 102. If yes, go to step 804; otherwise, execute step 802 again to keep checking occurrence of contact(s).

Step 804: Control the touch-sensitive display to display an unlocking object at a position where each contact is detected.

Step 806: Check if at least one displayed unlocking object is touched. If yes, go to step 811; otherwise, go to step 808.

Step 808: Check if a predetermined time period for displaying unlocking object(s) is expired. If yes, go to step 802; otherwise, go to step 806.

Step 811: Update the number of touching unlocking objects. Go to step 222.

Figure 9:
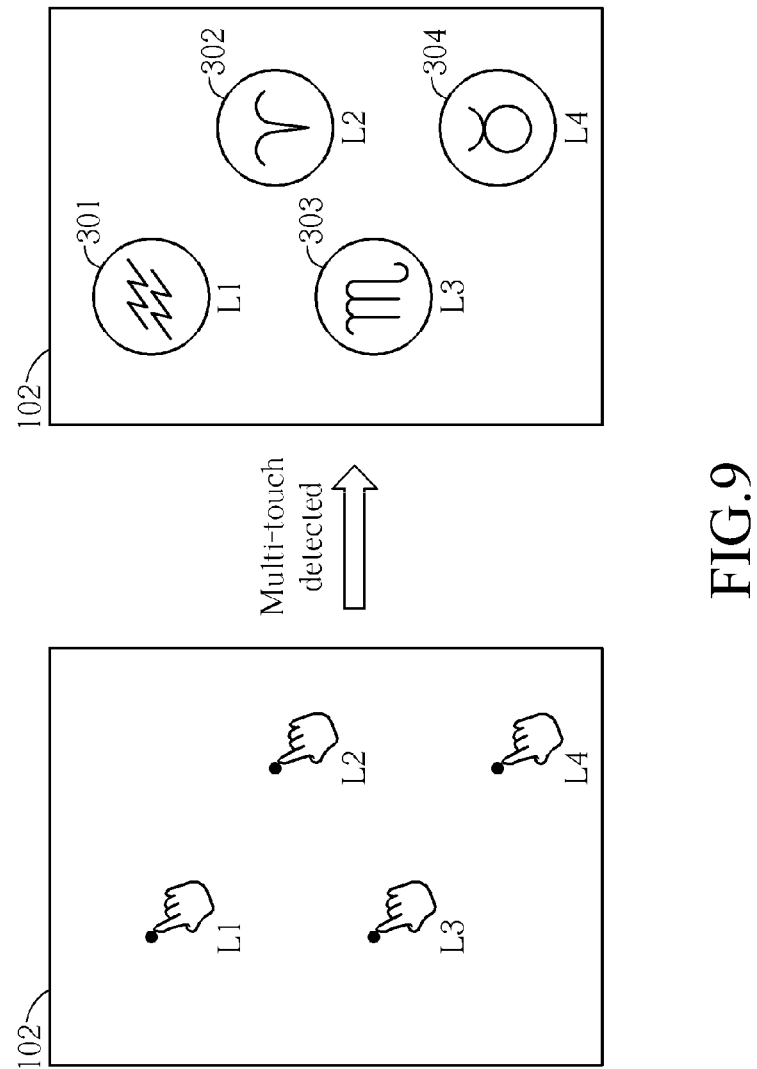
FIG. 9 is a diagram illustrating a fifth exemplary operational scenario of the unlocking procedure according to the present invention.

After the electronic device 100 enters the lock state, the touch-sensitive display 102 does not display unlocking objects until at least one contact is detected on the touch-sensitive display 102 (steps 802 and 804). In other words, the touch-sensitive display 102 shows nothing related to unlocking the electronic device 100 until the user touches the touch-sensitive display 102. Hence, when the user touches the touch-sensitive display 102 without any unlocking object displayed thereon, a location of each contact becomes a user-defined location of each unlocking object. FIG. 9 is a diagram illustrating a fifth exemplary operational scenario of the unlocking procedure according to the present invention. As shown in FIG. 9, the touch-sensitive display 102 is operated in a multi-touch mode, and the user has multiple contacts with the blank screen of the touch-sensitive display 102 at locations L1-L4. In response to the detected contacts at locations L1-L4, the processor 104 controls the touch-sensitive display 102 to display unlocking icons (e.g., zodiac icons/symbols) 301-304 at the user-defined locations L1-L4, respectively.

To put it another way, in response to one or more contacts with the touch-sensitive display that are detected at a first time point (e.g., in an initial unlocking procedure), the processor 104 controls the touch-sensitive display 102 to display an unlocking object at each position where a contact is detected; and in response to one or more contacts with the touch-sensitive display that are detected at a second time point (e.g., in a restarted unlocking procedure), the processor 104 controls the touch-sensitive display 102 to display an unlocking object at each position where a contact is detected.

It should be noted that the number of unlocking icons simultaneously displayed on the touch-sensitive display 102 may be adjusted by the user. For example, the user may have only two contacts with the touch-sensitive display 102 when the electronic device 100 is locked. Hence, the processor 104 controls the touch-sensitive display 102 to have only two unlocking icons displayed thereon.

Next, step 806 is executed to check if at least one displayed unlocking object is touched by the user. If no displayed unlocking object is touched, the flow proceeds with step 808 such that the processor 104 would determine if locations of currently displayed unlocking objects should be changed. If at least one displayed unlocking object is touched, the flow proceeds with step 811 such that the number of touching unlocking objects is updated. For example, an increment value (e.g., 1) is added to the currently recorded number of touching unlocking objects. As the kernel operations of steps 806 and 808 are identical to that of steps 206 and 208, further description is omitted here for brevity. Based on the setting of the second predetermined threshold checked in step 222, the electronic device 100 may be unlocked immediately after a first event of touching unlocking object(s) is detected at step 806, or may be unlocked after a first event of touching unlocking object(s) is detected at step 806 and one or more subsequent second events of touching unlocking object(s) are detected at step 219.

To put it simply, the touch-sensitive display 102 does not always display unlocking objects when the electronic device 100 is locked. In this way, the power consumption of the electronic device 100 is effectively reduced due to the power saving feature of the touch-sensitive display 102. Besides, as the user is allowed to manually control the location of each unlocking object, the user is capable of unlocking the electronic device 100 without looking at the screen of the touch-sensitive display 102, which improves the user experience greatly.

Figure 10:
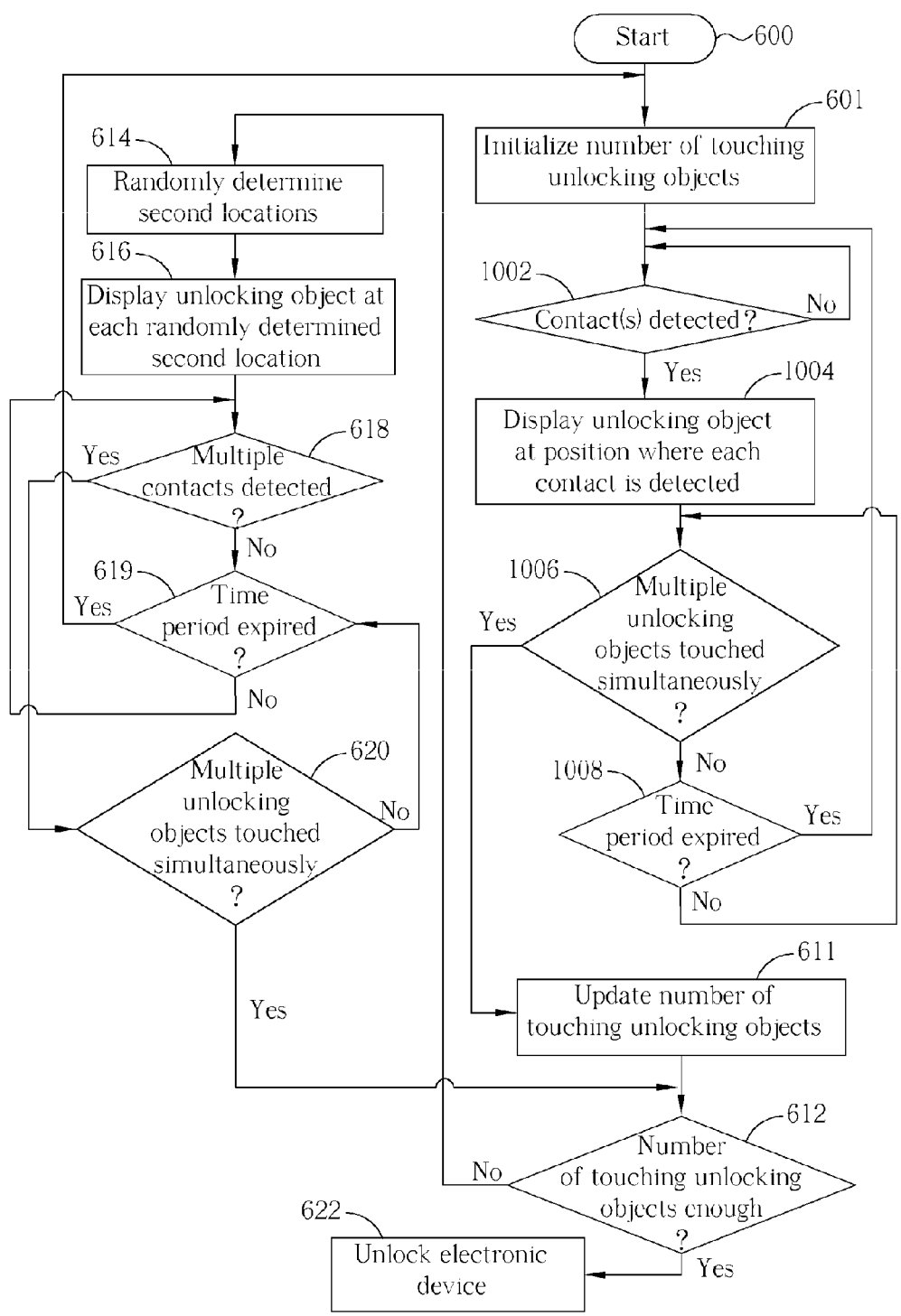
FIG. 10 is a flowchart illustrating a method of unlocking the electronic device shown in FIG. 1 according to a fourth embodiment of the present invention.

The same technical feature of manually defining initial locations of unlocking objects may be combined with other technical features of the present invention. Please refer to FIG. 10, which is a flowchart illustrating a method of unlocking the electronic device 100 shown in FIG. 1 according to a fourth embodiment of the present invention. If the result is substantially the same, the steps are not required to be executed in the exact order shown in FIG. 10. The flow shown in FIG. 10 is derived from modifying the flow in FIG. 6. The major difference between the unlocking procedures shown in FIG. 6 and FIG. 10 is the determination of initial location(s) of unlocking object(s) when the unlocking procedure is started or restarted. More specifically, steps 602, 604, 606 and 608 are replaced with steps 1002, 1004, 1006 and 1008, as below.

Step 1002: Check if multiple contacts are detected on the touch-sensitive display 102. If yes, go to step 1004; otherwise, execute step 1002 again to keep checking occurrence of contacts.

Step 1004: Control the touch-sensitive display to display an unlocking object at a position where each contact is detected.

Step 1006: Check if multiple displayed unlocking objects are touched simultaneously. If yes, go to step 611; otherwise, go to step 1008.

Step 1008: Check if a predetermined time period for displaying unlocking object(s) is expired. If yes, go to step 1002; otherwise, go to step 1006.

As a person skilled in the art can readily understand operations of steps 1002-1008 after reading above paragraphs, further description is omitted here for brevity.

Figure 11:
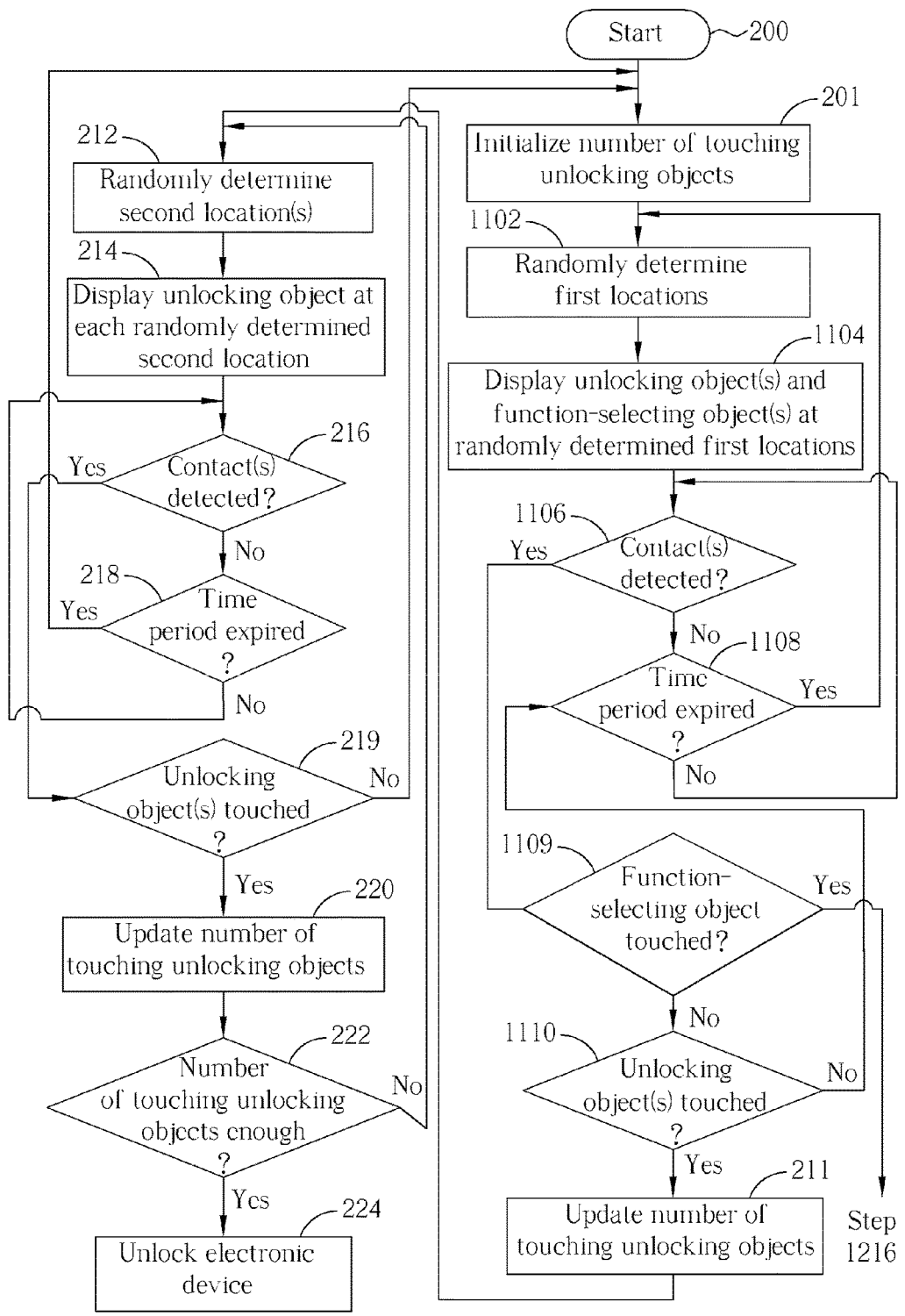
FIG. 11 is a flowchart illustrating a method of unlocking the electronic device shown in FIG. 1 according to a fifth embodiment of the present invention.
Figure 12:
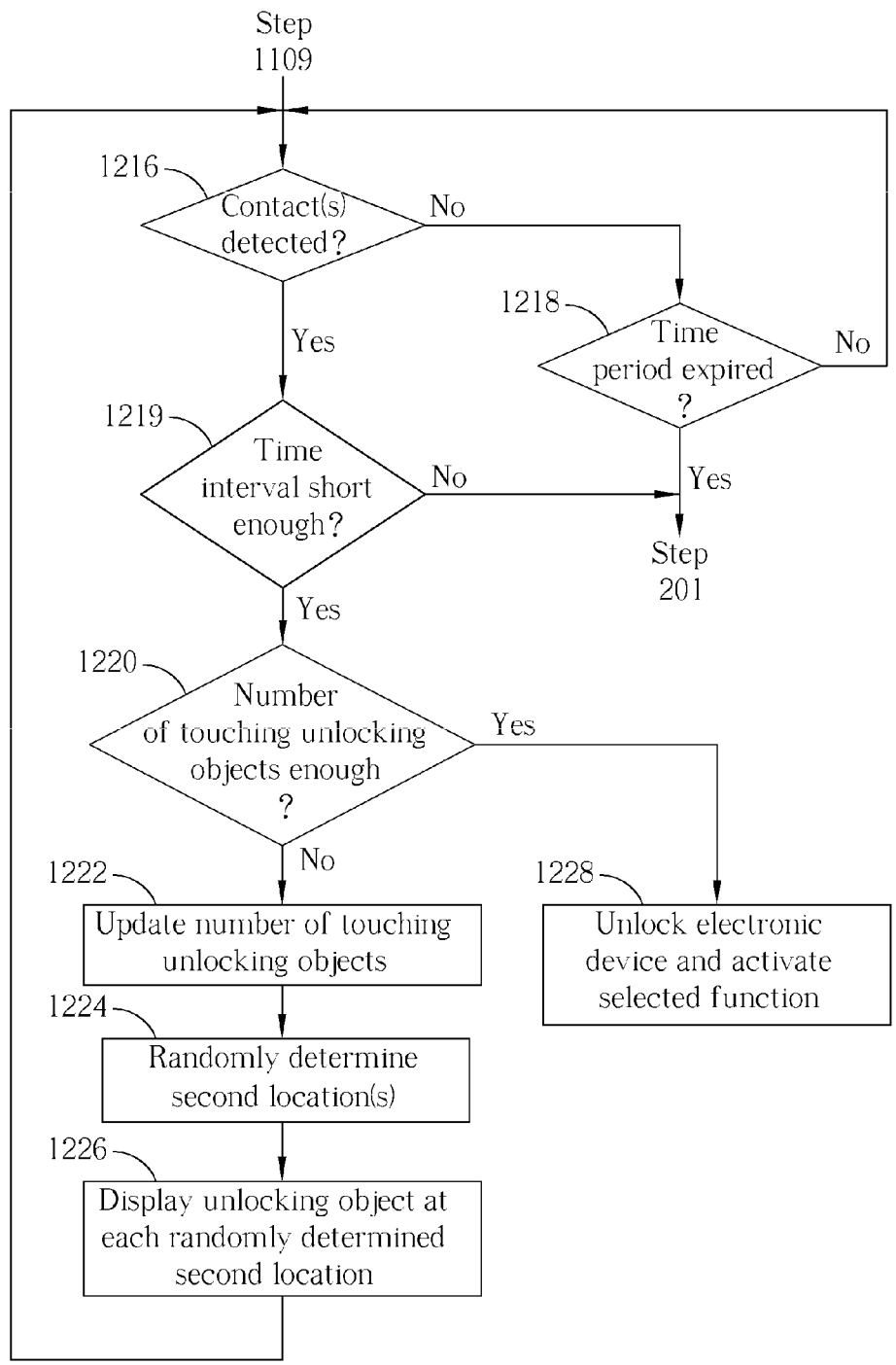
FIG. 12 is a continued flowchart of the flow shown in FIG. 11 or FIG. 17.

In addition to displaying unlocking objects, the touch-sensitive display 102 may be controlled to display addition objects (e.g., icons, symbols, or other image-based patterns) when the electronic device 100 is locked. For example, the touch-sensitive display 102 may display unlocking object(s) and function-selecting object(s) at the same time, thus allowing the user to select a desired function to be executed at the time the electronic device 10 is unlocked. Please refer to FIG. 11 in conjunction with FIG. 12. FIG. 11 is a flowchart illustrating a method of unlocking the electronic device 100 shown in FIG. 1 according to a fifth embodiment of the present invention. FIG. 12 is a continued flowchart of the flow shown in FIG. 11. If the result is substantially the same, the steps are not required to be executed in the exact order shown in FIGS. 11-12. The exemplary unlocking procedure is performed/controlled by the processor 104 executing the program code PROG, and includes following steps.

Step 200: Start.

Step 201: Set the number of contacts with the touch-sensitive display 102 detected at locations where unlocking objects are displayed (i.e., the number of touching unlocking objects) by an initial value (e.g., 0).

Step 1102: Randomly determine a plurality of first locations.

Step 1104: Control the touch-sensitive display 102 to display unlocking object(s) and function-selecting object(s) at the randomly determined first locations, respectively.

Step 1106: Check if at least one contact is detected on the touch-sensitive display 102. If yes, go to step 1109; otherwise, go to step 1108.

Step 1108: Check if a predetermined time period for displaying unlocking object(s) and function-selecting object(s) is expired. If yes, go to step 1102 to change randomly determined locations; otherwise, go to step 1106 to keep checking occurrence of contact(s).

Step 1109: Check if a displayed function-selecting object is touched. If yes, go to step 1216; otherwise, go to step 1110.

Step 1110: Check if at least one displayed unlocking object is touched. If yes, go to step 211; otherwise, go to step 1108.

Step 211: Update the number of touching unlocking objects.

Step 212: Randomly determine at least a second location.

Step 214: Control the touch-sensitive display 102 to display an unlocking object at each randomly determined second location.

Step 216: Check if at least one contact is detected on the touch-sensitive display 102. If yes, go to step 219; otherwise, go to step 218.

Step 218: Check if a predetermined time period for displaying unlocking object(s) is expired. If yes, go to step 201; otherwise, go to step 216.

Step 219: Check if a time interval between two contacts successively detected at locations where unlocking objects are displayed is smaller than a first predetermined threshold. If yes, go to step 220; otherwise, go to step 201.

Step 220: Update the number of touching unlocking objects.

Step 222: Check if the number of touching unlocking objects reaches a second predetermined threshold. If yes, go to step 224; otherwise, go to step 212 to change randomly determined location(s).

Step 224: Unlock the electronic device 100.

Step 1216: Check if at least one contact is detected on the touch-sensitive display 102. If yes, go to step 1219; otherwise, go to step 1218.

Step 1218: Check if a predetermined time period for displaying unlocking object(s) is expired. If yes, go to step 201 to restart the unlocking procedure; otherwise, go to step 1216 to keep checking occurrence of contact(s).

Step 1219: Check if a time interval between two contacts successively detected is smaller than a third predetermined threshold. If yes, go to step 1220; otherwise, go to step 201. It should be noted that the third predetermined threshold may be equal to or different from the first predetermined threshold, depending upon actual design consideration.

Step 1220: Check if the number of touching unlocking objects reaches a fourth predetermined threshold. If yes, go to step 1228; otherwise, go to step 1222. It should be noted that the fourth predetermined threshold may be equal to or different from the second predetermined threshold, depending upon actual design consideration.

Step 1222: Update the number of touching unlocking objects.

Step 1224: Randomly determine at least a second location.

Step 1226: Control the touch-sensitive display 102 to display an unlocking object at each randomly determined second location. Go to step 1216.

Step 1228: Unlock the electronic device 100 and activate the selected function designated by the function-selecting object touched by the user.

The major difference between the unlocking procedures shown in FIG. 2 and FIGS. 11-12 is the contact detection of a function-selecting object and the follow-up procedure (i.e., steps 1216-1224) performed due to the touched function-selecting object. Hence, steps 1102, 1106, 1108, 1109 and 1110 are introduced, where steps 1102, 1106, 1108 and 1110 in FIG. 11 take place of steps 202, 206, 208 and 210 in FIG. 2, respectively.

As one or more function-selecting objects may be displayed on the touch-sensitive display 102 when the electronic device 100 is in the lock state, the user may touch one function-selecting object to select a desired function which will be activated at the time the electronic device 100 is unlocked by the unlocking procedure. In this embodiment, each of the unlocking object(s) and function-selecting object(s) is not displayed at a pre-defined location of the touch-sensitive display 102. Specifically, locations assigned to unlocking object(s) and function-selecting object(s) would be randomized. Hence, before a contact touching any location on the touch-sensitive display 102 is detected, first locations are randomly determined (step 1102), and the touch-sensitive display 102 is controlled to display unlocking object(s) and function-selecting object(s) at the randomly determined first locations (step 1104). Similarly, the processor 104 checks the touch detection output generated from the touch-sensitive display 102 to determine if at least one contact is detected on the touch-sensitive display 102 (step 1106). If there is no contact detected on the touch-sensitive display 102, meaning that no unlocking object or function-selecting object is touched by the user, the processor 104 would determine if the locations of the currently displayed unlocking and function-selecting objects should be changed. In this embodiment, the processor 104 checks if a predetermined time period is expired (step 1108). When the predetermined time period is not expired yet, location of each currently displayed object is not changed. However, when the predetermined time period is expired, the locations assigned to the unlocking object(s) and function-selecting object(s) are randomized/re-generated.

Figure 13:
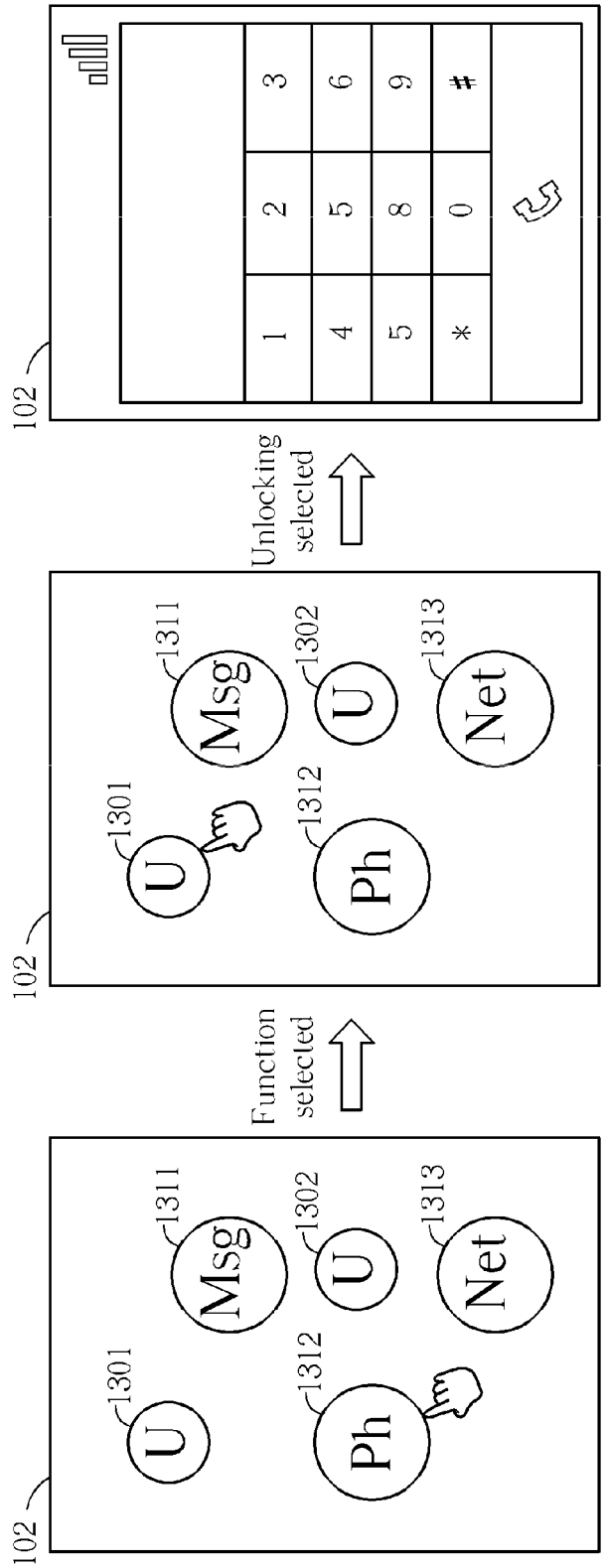
FIG. 13 is a diagram illustrating a sixth exemplary operational scenario of the unlocking procedure according to the present invention.

After one function-selecting object is touched (step 1109), it is possible that the user may want to unlock the electronic device 10 and activate a desired function corresponding to the touched function-selecting object at the same time. Thus, the follow-up procedure is to determine whether the criterion of unlocking the electronic device 100 is satisfied. FIG. 13 is a diagram illustrating a sixth exemplary operational scenario of the unlocking procedure according to the present invention. As shown in FIG. 13, the touch-sensitive display 102 has a plurality of unlocking icons 1301, 1302 and a plurality of function-selecting icons 1311, 1312, 1313. Assume that the fourth predetermined threshold checked in step 1220 is set by 1. When the user touches the function-selecting icon 1312 and the unlocking icon 1301 sequentially, the electronic device 10 is unlocked and the selected function (e.g., a dial function) is automatically enabled. It should be noted that the number of unlocking icons displayed on the touch-sensitive display 102 and the number of function-selecting icons displayed on the touch-sensitive display 102 are for illustrative purposes only.

In another case where each contact detected on the touch-sensitive display 102 does not touch any displayed function-selecting object, it is possible that the user may want to unlock the electronic device 10 only. Thus, the follow-up procedure simply determines if the electronic device 100 should be unlocked such that no function is automatically activated when the unlocking criterion is satisfied.

As a person skilled in the art can readily understand operations of steps 211-224 and 1216-1228 after reading above paragraphs directed to FIG. 2, further description is omitted here for brevity.

Figure 14:
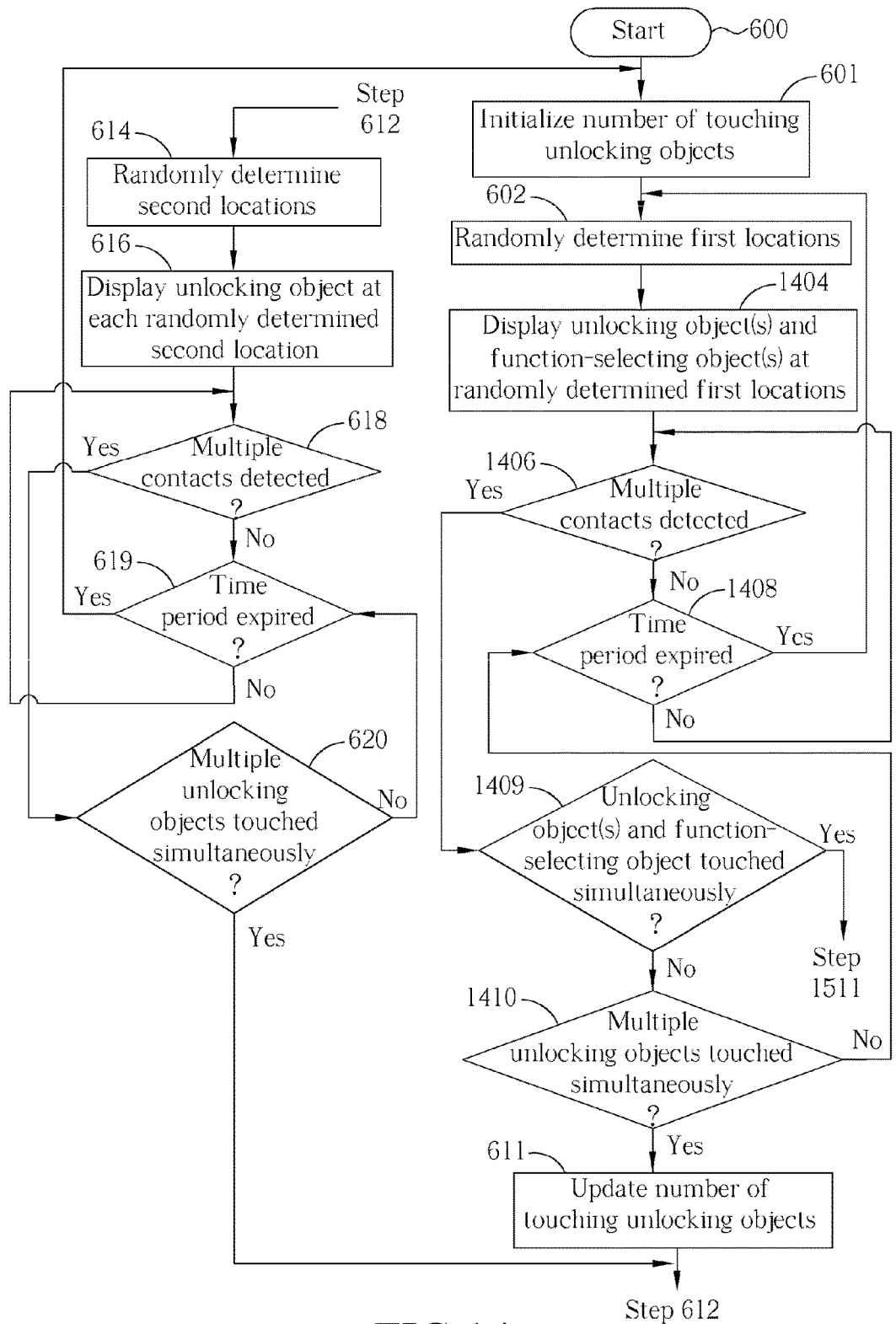
FIG. 14 is a flowchart illustrating a method of unlocking the electronic device shown in FIG. 1 according to a sixth embodiment of the present invention.
Figure 15:
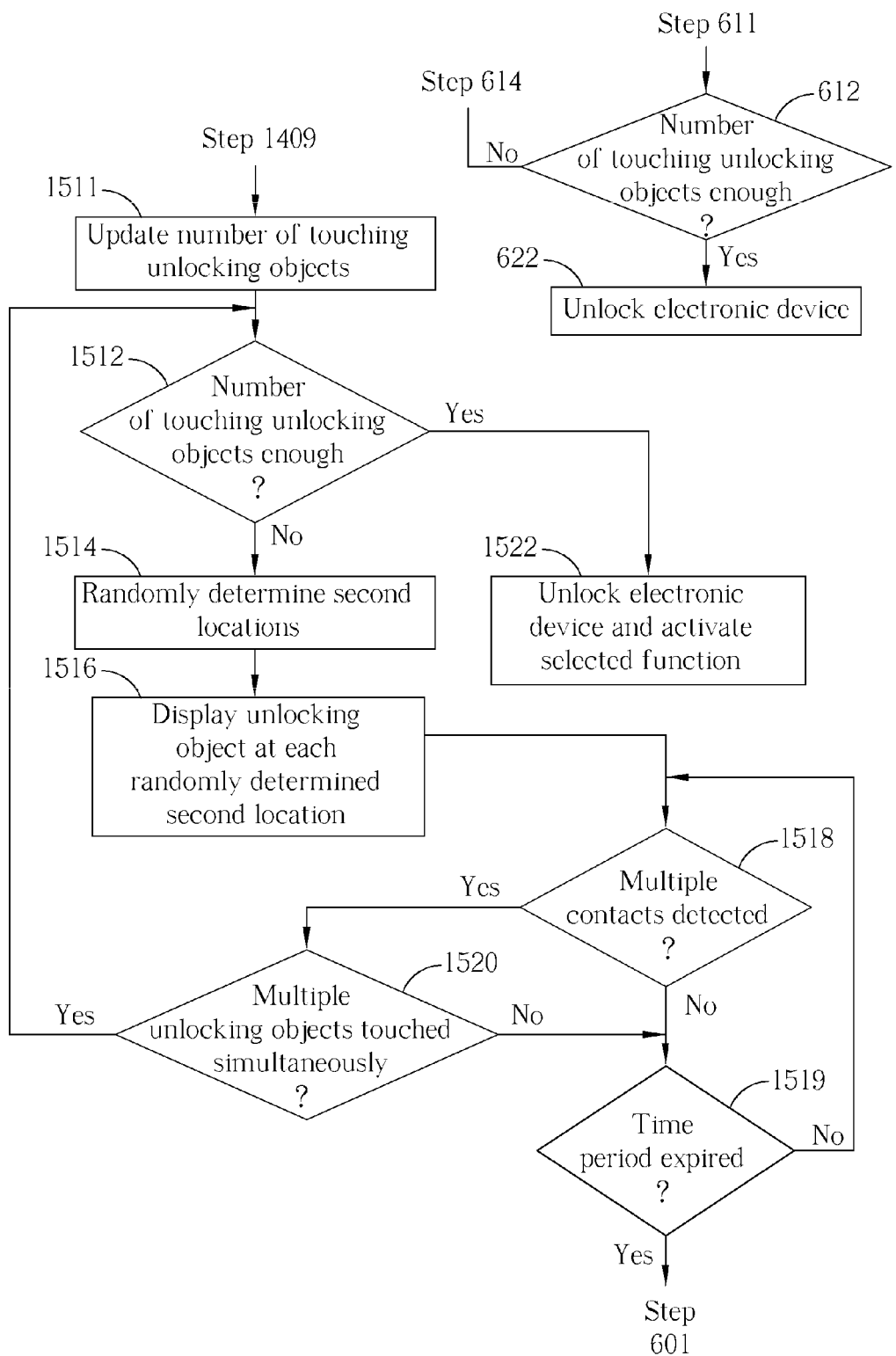
FIG. 15 is a continued flowchart of the flow shown in FIG. 14 or FIG. 18.

In above example shown in FIGS. 11-12, the function-selecting object and the unlocking object (e.g., the function-selecting icon 1312 and unlocking icon 1301) are required to be sequentially touched by the user to activate the selected function at the time the electronic device 100 is unlocked. However, in an alternative design where the touch-sensitive display 102 supports a multi-touch mode, the same result may be achieved by touching multiple displayed objects simultaneously. Please refer to FIG. 14 in conjunction with FIG. 15. FIG. 14 is a flowchart illustrating a method of unlocking the electronic device 100 shown in FIG. 1 according to a sixth embodiment of the present invention. FIG. 15 is a continued flowchart of the flow shown in FIG. 14. If the result is substantially the same, the steps are not required to be executed in the exact order shown in FIGS. 14-15. The exemplary unlocking procedure is performed/controlled by the processor 104 executing the program code PROG, and includes following steps.

Step 600: Start.

Step 601: Set the number of contacts with the touch-sensitive display 102 detected at locations where unlocking objects are displayed (i.e., the number of touching unlocking objects) by an initial value (e.g., 0).

Step 602: Randomly determine a plurality of first locations.

Step 1404: Control the touch-sensitive display 102 to display unlocking object(s) and function-selecting object(s) at the randomly determined first locations, respectively.

Step 1406: Check if multiple contacts are detected on the touch-sensitive display 102. If yes, go to step 1409; otherwise, go to step 1408.

Step 1408: Check if a predetermined time period for displaying unlocking object(s) and function-selecting object(s) is expired. If yes, go to step 602 to change randomly determined locations; otherwise, go to step 1406 to keep checking occurrence of contacts.

Step 1409: Check if at least one displayed unlocking object and a displayed function-selecting object are touched simultaneously. If yes, go to step 1511; otherwise, go to step 610.

Step 1410: Check if multiple displayed unlocking objects are touched simultaneously. If yes, go to step 611; otherwise, go to step 1408.

Step 611: Update the number of touching unlocking objects.

Step 612: Check if the number of touching unlocking objects reaches a first predetermined threshold. If yes, go to step 622; otherwise, go to step 614.

Step 614: Randomly determine a plurality of second locations.

Step 616: Control the touch-sensitive display 102 to display an unlocking object at each randomly determined second location.

Step 618: Check if multiple contacts are detected on the touch-sensitive display 102. If yes, go to step 620; otherwise, go to step 619.

Step 619: Check if a predetermined time period for displaying unlocking objects is expired. If yes, go to step 601; otherwise, go to step 618.

Step 620: Check if multiple displayed unlocking objects are touched simultaneously. If yes, go to step 612; otherwise, go to step 619.

Step 622: Unlock the electronic device 100.

Step 1511: Update the number of touching unlocking objects.

Step 1512: Check if the number of touching unlocking objects reaches a second predetermined threshold. If yes, go to step 1522; otherwise, go to step 1514. The second predetermined threshold may be equal to or different from the first predetermined threshold, depending upon actual design consideration.

Step 1514: Randomly determine a plurality of second locations.

Step 1516: Control the touch-sensitive display 102 to display an unlocking object at each randomly determined second location.

Step 1518: Check if multiple contacts are detected on the touch-sensitive display 102. If yes, go to step 1520; otherwise, go to step 1519.

Step 1519: Check if a predetermined time period for displaying unlocking objects is expired. If yes, go to step 601 to restart the unlocking procedure; otherwise, go to step 1518.

Step 1520: Check if multiple displayed unlocking objects are touched simultaneously. If yes, go to step 1512; otherwise, go to step 1519.

Step 1522: Unlock the electronic device 100 and activate the selected function designated by the function-selecting object touched by the user.

The major difference between the unlocking procedures shown in FIG. 6 and FIGS. 14-15 is the contact detection of a function-selecting object and the follow-up procedure (i.e., steps 1511-1522) performed due to simultaneously selected function-selecting object and unlocking object(s). Hence, steps 1404, 1406, 1408, 1409 and 1410 are introduced, where steps 1404, 1406, 1408 and 1410 in FIG. 14 take place of steps 604, 606, 608 and 610 in FIG. 6, respectively.

Figure 16:
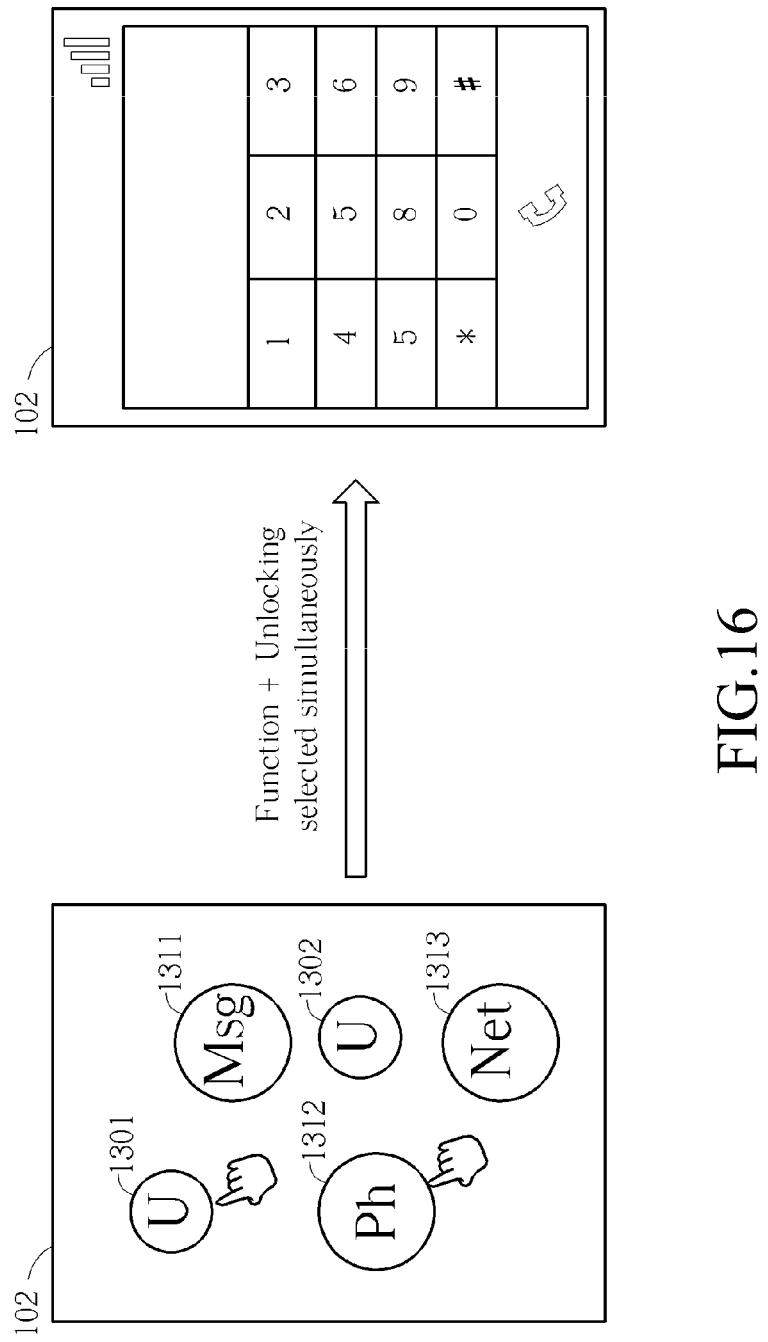
FIG. 16 is a diagram illustrating a seventh exemplary operational scenario of the unlocking procedure according to the present invention.

After one function-selecting object and at least one unlocking object are simultaneously touched (step 1409), it is possible that the user may want to unlock the electronic device 10 and activate a desired function corresponding to the touched function-selecting object at the same time. Thus, the follow-up procedure is to determine whether the criterion of unlocking the electronic device 100 is satisfied. FIG. 16 is a diagram illustrating a seventh exemplary operational scenario of the unlocking procedure according to the present invention. As shown in FIG. 16, the touch-sensitive display 102 has a plurality of unlocking icons 1301, 1302 and a plurality of function-selecting icons 1311, 1312, 1313. Assume that the second predetermined threshold checked in step 1512 is set by 1. When the user touches the function-selecting icon 1312 and the unlocking icon 1301 simultaneously, the electronic device 10 is unlocked and the selected function (e.g., a dial function) is automatically enabled. It should be noted that the number of unlocking icons displayed on the touch-sensitive display 102 and the number of function-selecting icons displayed on the touch-sensitive display 102 are for illustrative purposes only.

In another case where each contact detected on the touch-sensitive display 102 does not touch any displayed function-selecting object, it is possible that the user may want to unlock the electronic device 10 only. Thus, the follow-up procedure simply determines if the electronic device 100 should be unlocked, and no function is automatically activated when the unlocking criterion is satisfied.

As a person skilled in the art can readily understand operations of steps shown in FIGS. 14-15 after reading above paragraphs, further description is omitted here for brevity.

Figure 17:
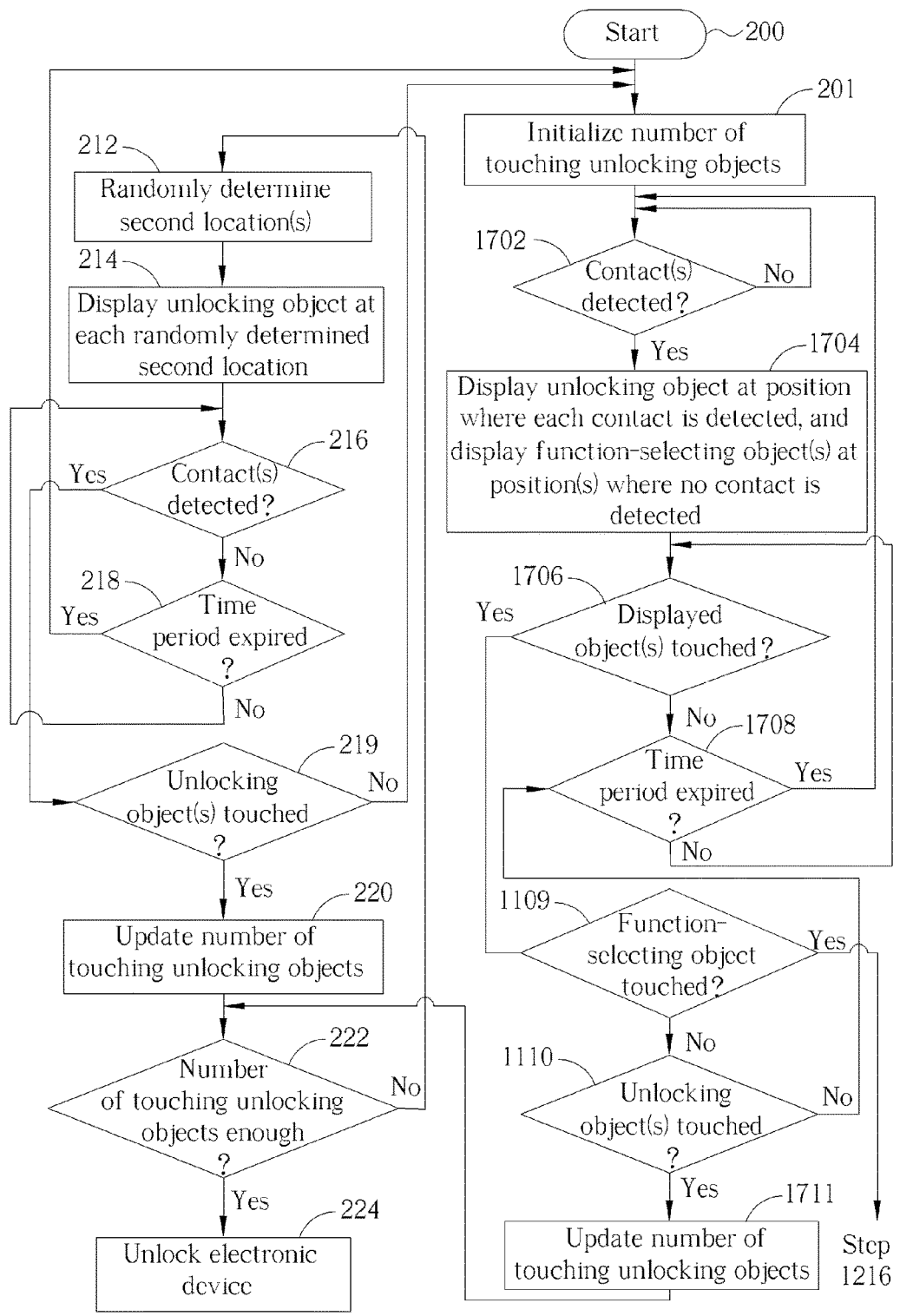
FIG. 17 is a flowchart illustrating a method of unlocking the electronic device shown in FIG. 1 according to a seventh embodiment of the present invention.

Regarding the aforementioned examples shown in FIGS. 11-12 and FIGS. 14-15, locations of unlocking object(s) and function-selecting object(s) are randomly determined/defined by the processor 104 executing the program code PROG. As mentioned above, locations of unlocking object(s) and function-selecting object(s) may be manually determined/defined by the user. Please refer to FIG. 17 in conjunction with FIG. 12. FIG. 17 is a flowchart illustrating a method of unlocking the electronic device 100 shown in FIG. 1 according to a seventh embodiment of the present invention, where FIG. 12 is also a continued flowchart of the flow shown in FIG. 17. If the result is substantially the same, the steps are not required to be executed in the exact order shown in FIGS. 17 and 12. The flow shown in FIG. 17 is derived from modifying the flow in FIG. 11. The major difference between the unlocking procedures shown in FIG. 11 and FIG. 17 is the determination of initial locations of unlocking object(s) and function-selecting object(s) when the unlocking procedure is started or restarted. More specifically, steps 1102, 1104, 1106, 1108 and 211 are replaced with steps 1702, 1704, 1706, 1708 and 1711, as below.

Step 1702: Check if at least one contact is detected on the touch-sensitive display 102. If yes, go to step 1704; otherwise, execute step 1702 again to keep checking occurrence of contact(s).

Step 1704: Control the touch-sensitive display to display an unlocking object at a position where each contact is detected, and control the touch-sensitive display to display function-selecting object(s) at position(s) where no contact is detected.

Step 1706: Check if at least one displayed object is touched. If yes, go to step 1109; otherwise, go to step 1708.

Step 1708: Check if a predetermined time period for displaying unlocking object(s) and function-selecting object(s) is expired. If yes, go to step 1702; otherwise, go to step 1706.

Step 1711: Update the number of touching unlocking objects. Go to step 222.

As a person skilled in the art can readily understand operations of steps shown in FIGS. 17 and 12 after reading above paragraphs, further description is omitted here for brevity. It should be noted that based on the setting of the second predetermined threshold checked in step 222, the electronic device 100 may be unlocked immediately after a first event of touching unlocking object(s) is detected at step 1110, or may be unlocked after a first event of touching unlocking object(s) is detected at step 1110 and one or more subsequent second events of touching unlocking object(s) are detected at step 219.

Figure 18:
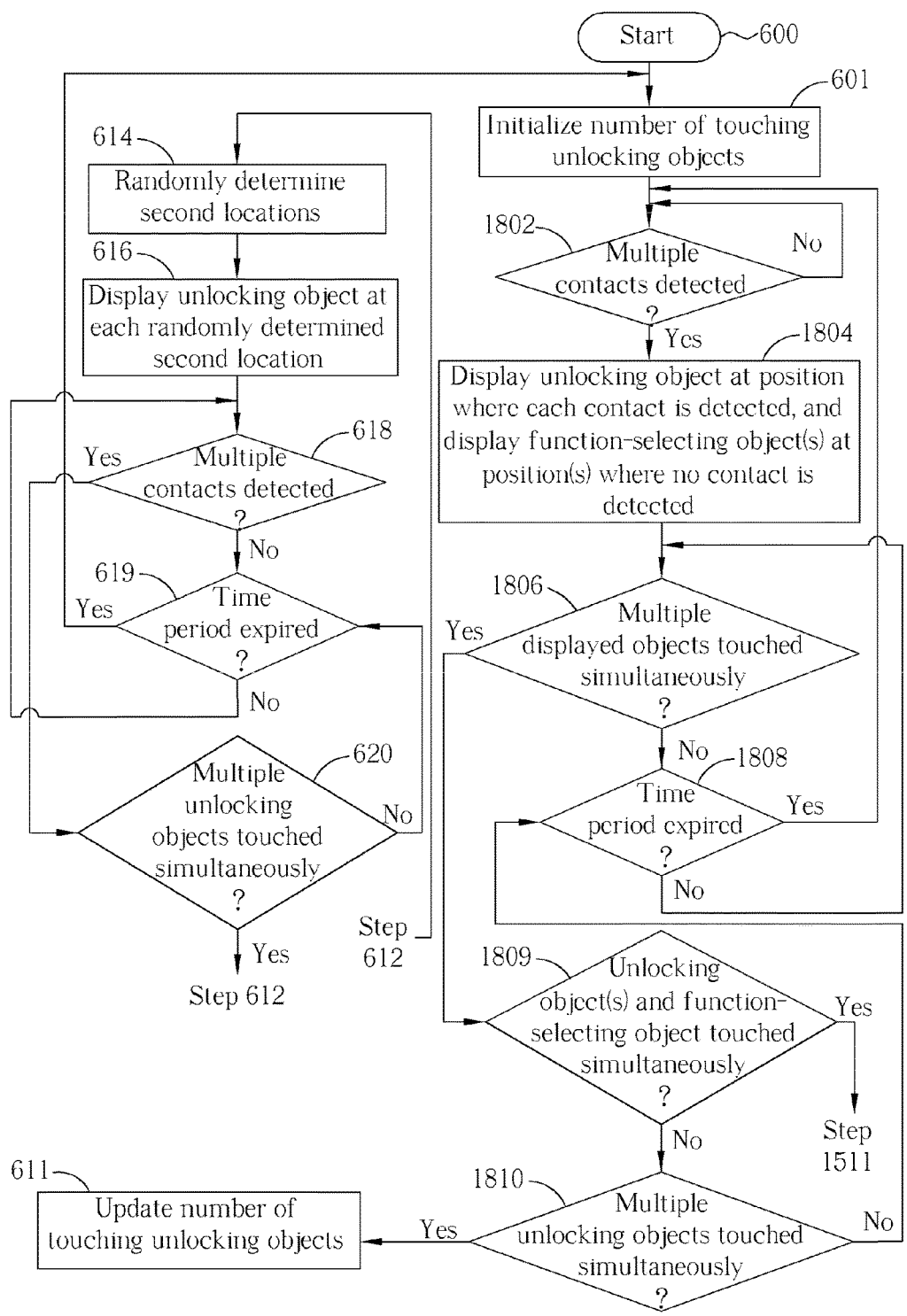
FIG. 18 is a flowchart illustrating a method of unlocking the electronic device shown in FIG. 1 according to an eighth embodiment of the present invention.

Please refer to FIG. 18 in conjunction with FIG. 15. FIG. 18 is a flowchart illustrating a method of unlocking the electronic device 100 shown in FIG. 1 according to an eighth embodiment of the present invention, where FIG. 15 is also a continued flowchart of the flow shown in FIG. 18. If the result is substantially the same, the steps are not required to be executed in the exact order shown in FIGS. 18 and 15. The flow shown in FIG. 18 is derived from modifying the flow in FIG. 14. The major difference between the unlocking procedures shown in FIG. 14 and FIGS. 18 and 15 is the determination of initial location(s) of unlocking object(s) when the unlocking procedure is started or restarted. More specifically, steps 602, 1404, 1406, 1408, 1409 and 1410 are replaced with steps 1802, 1804, 1806, 1808, 1809 and 1810, as below.

Step 1802: Check if multiple contacts are detected on the touch-sensitive display 102. If yes, go to step 1804; otherwise, execute step 1802 again to keep checking occurrence of contacts.

Step 1804: Control the touch-sensitive display to display an unlocking object at a position where each contact is detected, and control the touch-sensitive display to display function-selecting object(s) at position(s) where no contact is detected.

Step 1806: Check if multiple displayed objects are touched simultaneously. If yes, go to step 1809; otherwise, go to step 1808.

Step 1808: Check if a predetermined time period for displaying unlocking object(s) and function-selecting object(s) is expired. If yes, go to step 1802; otherwise, go to step 1806.

Step 1809: Check if at least one displayed unlocking object and a displayed function-selecting object are touched simultaneously. If yes, go to step 1511; otherwise, go to step 1810.

Step 1810: Check if multiple displayed unlocking objects are touched simultaneously. If yes, go to step 611; otherwise, go to step 1808.

As a person skilled in the art can readily understand operations of steps shown in FIGS. 18 and 15 after reading above paragraphs, further description is omitted here for brevity.

In above embodiments, the contacts sequentially touching two unlocking objects (or one unlocking object and one function-selecting object) may be generated in response to user's finger tapping the touch-sensitive display 102 two times. Alternatively, the contacts sequentially touching two unlocking objects (or one unlocking object and one function-selecting object) may be generated in response to user's finger sliding on the touch-sensitive display 102, where a start point of the sliding action may serve as one contact, and an end point of the sliding action may serve as the other contact. To put is simply, the present invention has no limitation on the generation of contacts on the touch-sensitive display 102.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method of unlocking an electronic device having a touch-sensitive display, the method comprising:
   in response to at least one contact with the touch-sensitive display, controlling the touch-sensitive display to have an unlocking object displayed at each position of the at least one contact detected; and
   when any contact is detected on the touch-sensitive display after each unlocking object generated in response to the at least one contact is displayed, determining whether to unlock the electronic device by at least referring to a number of touched unlocking objects on the touch-sensitive display;
   wherein the step of determining whether to unlock the electronic device comprises:
   setting a first predetermined threshold;
   after at least one unlocking object displayed in response to the at least one contact is touched, checking if the number of touched unlocking objects reaches the first predetermined threshold;
   if the number of touched unlocking objects does not reach the first predetermined threshold, randomly determining at least one position, and controlling the touch-sensitive display to display an unlocking object at each randomly determined position; and
   if the number of touched unlocking objects reaches the first predetermined threshold, unlocking the electronic device.

2. The method of claim 1, further comprising:
   controlling the touch-sensitive display to have function-selecting objects displayed at different locations for the different time points, wherein each function-selecting object corresponds to a function supported by the electronic device;
   wherein the step of determining whether to unlock the electronic device further comprises:
   determining whether to unlock the electronic device and execute a selected function by referring to a contact status on the touch-sensitive display.

3. The method of claim 2, wherein the step of controlling the touch-sensitive display to have function-selecting objects displayed at different locations for the different time points comprises:
   randomly determining at least a first position;
   at a first time point, displaying a function-selecting object at each first position;
   randomly determining at least a second position; and
   at a second time point, displaying a function-selecting object at each second position.

4. The method of claim 2, wherein the step of controlling the touch-sensitive display to have function-selecting objects displayed at different locations for the different time points comprises:
   in response to at least a first contact with the touch-sensitive display that is detected at a first time point, displaying at least one function-selecting object at at least one position where no first contact is detected; and
   in response to at least a second contact with the touch-sensitive display that is detected at a second time point, displaying at least one function-selecting object at at least one position where no second contact is detected.

5. The method of claim 2, wherein the step of determining whether to unlock the electronic device and execute the selected function comprises:
   checking if the contact status indicates that at least one first contact with the touch-sensitive display at at least one first location where at least one unlocking object is displayed is detected and also indicates that a second contact with the touch-sensitive display at a second location where a function-selecting object is displayed is detected; and
   selectively unlocking the electronic device and executing the selected function according to a checking result of the contact status on the touch-sensitive display.

6. The method of claim 5, wherein the step of selectively unlocking the electronic device and executing the selected function according to the checking result comprises:
   when the checking result indicates that the at least one first contact and the second contact are detected simultaneously, unlocking the electronic device and executing the selected function designated by the function-selecting object.

7. The method of claim 5, wherein the step of selectively unlocking the electronic device and executing the selected function according to the checking result comprises:
   when the checking result indicates that the at least one first contact and the second contact are detected nonsimultaneously, unlocking the electronic device and executing the selected function designated by the function-selecting object.

8. The method of claim 7, wherein the contact status is further checked to determine whether a time interval between any two successively detected contacts of the at least one first contact and the second contact is smaller than a second predetermined threshold; and the electronic device is unlocked and the selected function is executed when the checking result indicates that the at least one first contact and the second contact are detected nonsimultaneously and the time interval is smaller than the second predetermined threshold.

9. The method of claim 1, wherein the at least one contact comprises a plurality of contacts, and unlocking objects displayed in response to the contacts comprises at least one first unlocking object and at least one second unlocking object the step of determining whether to unlock the electronic device comprises:
checking if the contact status indicates that at least one first contact with the touch-sensitive display at at least one first location where the at least one first unlocking object is displayed is detected and also indicates that at least one second contact with the touch-sensitive display at at least one second location where the at least one second unlocking object is displayed is detected;
wherein the step of checking if the number of touched unlocking objects reaches the first predetermined threshold is executed when a checking result of the contact status indicates that the at least one first contact and the second contact are detected simultaneously.

10. The method of claim 1, wherein the at least one randomly determined position comprises a plurality of randomly determined positions, and unlocking objects displayed at the randomly determined positions comprises at least one first unlocking object and at least one second unlocking object; the step of determining whether to unlock the electronic device further comprises:
checking if at least one first contact with the touch-sensitive display at at least one first location where the at least one first unlocking object is displayed is detected and also at least one second contact with the touch-sensitive display at at least one second location where the at least one second unlocking object is displayed is detected; and
when the checking result indicates that the at least one first contact and the second contact are detected simultaneously, the step of checking if the number of touched unlocking objects reaches the first predetermined threshold is executed.

11. The method of claim 1, wherein a number of unlocking objects each displayed at a randomly determined position is smaller than a number of unlocking objects each displayed in response to a contact.

12. The method of claim 1, wherein a type of information shown on the at least one unlocking object displayed at the at least one randomly determined position is different from a type of information shown on the at least one unlocking object displayed in response to the at least one contact.

13. The method of claim 1, wherein the step of determining whether to unlock the electronic device further comprises:
checking if a predetermined time period is expired before at least one unlocking object displayed at the at least one randomly determined position is touched; and
when the at least one unlocking object displayed at the at least one randomly determined position is touched within the predetermined time period, checking if the number of touched unlocking objects reaches the first predetermined threshold.

14. The method of claim 1, wherein the step of determining whether to unlock the electronic device further comprises:
checking if a predetermined time period is expired before the at least one unlocking object displayed in response to the at least one contact is touched;
wherein the step of checking if the number of touched unlocking objects reaches the first predetermined threshold is executed when the at least one unlocking object displayed in response to the at least one contact is touched within the predetermined time period.

15. The method of claim 1, wherein the electronic device is a mobile phone.

16. A non-transitory computer readable medium storing a program code, wherein the program code causes a processor to perform following steps when executed by the processor:
in response to at least one contact with the touch-sensitive display, controlling the touch-sensitive display to have an unlocking object displayed at each position of the at least one contact detected; and
when any contact is detected on the touch-sensitive display after each unlocking object generated in response to the at least one contact is displayed, determining whether to unlock an electronic device by at least referring to a number of touched unlocking objects on the touch-sensitive display;
wherein the step of determining whether to unlock the electronic device comprises:
setting a first predetermined threshold;
after at least one unlocking object displayed in response to the at least one contact is touched, checking if the number of touched unlocking objects reaches the first predetermined threshold;
if the number of touched unlocking objects does not reach the first predetermined threshold, randomly determining at least one position, and controlling the touch-sensitive display to display an unlocking object at each randomly determined position; and
if the number of touched unlocking objects reaches the first predetermined threshold, unlocking the electronic device.

* * * * *